US012537099B2

(12) United States Patent
Kim et al.

(10) Patent No.: US 12,537,099 B2
(45) Date of Patent: Jan. 27, 2026

(54) METHOD FOR MONITORING USERS AND PROVIDING INFORMATION, AND DEVICE THEREOF

(71) Applicant: Samsung Electronics Co., Ltd., Suwon-si (KR)

(72) Inventors: Hyeonseong Kim, Suwon-si (KR); Jeongmin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 472 days.

(21) Appl. No.: 18/091,120

(22) Filed: Dec. 29, 2022

(65) Prior Publication Data

US 2023/0197264 A1 Jun. 22, 2023

Related U.S. Application Data

(63) Continuation of application No. PCT/KR2021/005430, filed on Apr. 29, 2021.

(30) Foreign Application Priority Data

Jun. 30, 2020 (KR) .......................... 10-2020-0080313

(51) Int. Cl.
*G16H 40/63* (2018.01)
*G06F 1/16* (2006.01)

(52) U.S. Cl.
CPC ........... *G16H 40/63* (2018.01); *G06F 1/1618* (2013.01); *G06F 1/1681* (2013.01)

(58) Field of Classification Search
CPC ...... G16H 40/63; G06F 1/1618; G06F 1/1681
See application file for complete search history.

(56) References Cited

U.S. PATENT DOCUMENTS 8,947,382 B2 * 2/2015 Winkler ................. G06F 3/017
345/173
10,088,901 B2 * 10/2018 Kang ...................... G06F 3/014
(Continued)

FOREIGN PATENT DOCUMENTS

CN 111124561 5/2020
EP 4 057 135 9/2022
(Continued)

OTHER PUBLICATIONS

International Search Report for PCT/KR2021/005430 dated Aug. 24, 2021, 4 pages.
(Continued)

*Primary Examiner* — Doon Y Chow
(74) *Attorney, Agent, or Firm* — Nixon & Vanderhye P.C.

(57) ABSTRACT

An electronic device may include: a first housing; a second housing coupled to the first housing via at least a connection member; at least one sensor; a communication circuit; a flexible display disposed across one surface of the first housing and one surface of the second housing; a memory; and a processor operatively connected to the at least one sensor, the communication circuit, the flexible display, and the memory, wherein the processor may establish short-range wireless communication connection with a wearable device via at least an existing communication circuit, enter a flex mode on the basis of the angle between the first housing and the second housing, use the short-range wireless communication connection to receive, from the wearable device, first user activity information acquired by the wearable device, acquire second user activity information via at least the at least one sensor in response to the received first user activity information satisfying a predetermined condition, acquire user context information on the basis of the first user activity information and the second user activity information, and provide content corresponding to
(Continued)

the acquired user context information via at least the flexible display.

16 Claims, 21 Drawing Sheets

(56) References Cited

U.S. PATENT DOCUMENTS

| | | | |
|---|---|---|---|
| 10,534,534 B2 | 1/2020 | Cheong et al. | |
| 10,952,667 B2* | 3/2021 | Oh | A61B 5/681 |
| 11,755,072 B2* | 9/2023 | Ito | G06F 3/0488 |
| | | | 345/156 |
| 11,775,025 B2* | 10/2023 | Chen | G09G 5/14 |
| | | | 345/156 |
| 2014/0101578 A1 | 4/2014 | Kwak et al. | |
| 2014/0164611 A1* | 6/2014 | Molettiere | A61B 5/1118 |
| | | | 709/224 |
| 2015/0331598 A1* | 11/2015 | Kang | G06F 3/014 |
| | | | 715/765 |
| 2016/0132074 A1 | 5/2016 | Kim et al. | |
| 2016/0246470 A1 | 8/2016 | Doi et al. | |
| 2017/0221456 A1 | 8/2017 | Kim et al. | |
| 2018/0224980 A1 | 8/2018 | Avila et al. | |

FOREIGN PATENT DOCUMENTS

| | | | | |
|---|---|---|---|---|
| JP | 2017-108345 | | 6/2017 | |
| KR | 10-2015-0131695 | | 11/2015 | |
| KR | 10-1582347 | | 1/2016 | |
| KR | 10-2016-0055646 | | 5/2016 | |
| KR | 10-2017-0090851 | | 8/2017 | |
| KR | 20180015533 A | * | 2/2018 | .......... G06F 3/0484 |
| KR | 10-2018-0043866 | | 5/2018 | |
| KR | 10-1984683 | | 5/2019 | |
| KR | 10-2019-0085604 | | 7/2019 | |
| KR | 10-2019-0099847 | | 8/2019 | |
| KR | 10-2019-0107047 | | 9/2019 | |

OTHER PUBLICATIONS

Written Opinion of the ISA for PCT/KR2021/005430 dated Aug. 24, 2021, 5 pages.
Korean Office Action dated Feb. 19, 2025 for KR Application No. 10-2020-0080313.
Korean Notice of Patent Grant dated Oct. 16, 2025 for KR Application No. 10-2020-0080313.

* cited by examiner

METHOD FOR MONITORING USERS AND PROVIDING INFORMATION, AND DEVICE THEREOF

CROSS-REFERENCE TO RELATED APPLICATIONS

This application is a continuation of International Application No. PCT/KR2021/005430 filed on Apr. 29, 2021, designating the United States, in the Korean Intellectual Property Receiving Office, and claiming priority to KR 10-2020-0080313, filed on Jun. 30, 2020, the disclosures of which are all hereby incorporated by reference herein in their entireties.

BACKGROUND

Field

Various example embodiments relate to aa method and/or a device for providing context information based on user activities through, for example, an always-on-display (AOD) of a foldable device.

Description of Related Art

When a foldable device is folded at a predetermined angle or more, the foldable device may switch to a flex mode. In the state in which the foldable device is switched to the flex mode, the foldable device may provide basic information including the time and date through an AOD.

SUMMARY

A foldable device having switched to a flex mode may provide basic information including the time and date through an AOD. However, the foldable device cannot provide additional information based on the user activity information (e.g., work time, rest time, work posture, and/or work concentration).

An electronic device according to an example embodiment may include a first housing, a second housing coupled, directly or indirectly, to the first housing through at least a connection member, at least one sensor, a communication circuit, a flexible display disposed over one surface of the first housing and one surface of the second housing, a memory, and a processor operatively connected, directly or indirectly, to the at least one sensor, the communication circuit, the flexible display, and the memory, wherein the processor may be configured to establish short-range wireless communication connection with a wearable device through the communication circuit, enter a flex mode, based on an angle between the first housing and the second housing, receive, from the wearable device, first user activity information obtained by the wearable device using the short-range wireless communication connection, obtain second user activity information through the at least one sensor in response to the received first user activity information satisfying a predetermined condition, obtain user context information, based on the first user activity information and the second user activity information, and provide content corresponding to the obtained user context information through the flexible display.

According to various example embodiments, there may be provided a method and/or an electronic device for providing context information useful for a user, based on information obtained from a sensor included in a foldable device and/or an external device connected to the foldable device through communication.

According to various example embodiments, it is possible to display user context information, based on user activity information received from a wearable device interworking with a foldable device, in the state in which the foldable device switches to a flex mode. This may cause the user to enhance the user experience.

In addition, various effects that are directly or indirectly recognized through this document may be provided.

BRIEF DESCRIPTION OF DRAWINGS

The above and other aspects, features, and advantages of certain example embodiments will be more apparent from the following detailed description, taken in conjunction with the accompanying drawings, in which.

In connection with the description of the drawings, the same or similar reference numerals may be used for the same or similar elements.

DETAILED DESCRIPTION

Hereinafter, various embodiments will be described with reference to the accompanying drawings. However, this is not intended to limit a specific embodiment, and it should be understood to include various modifications, equivalents, and/or alternatives of the embodiments.

Figure 1:
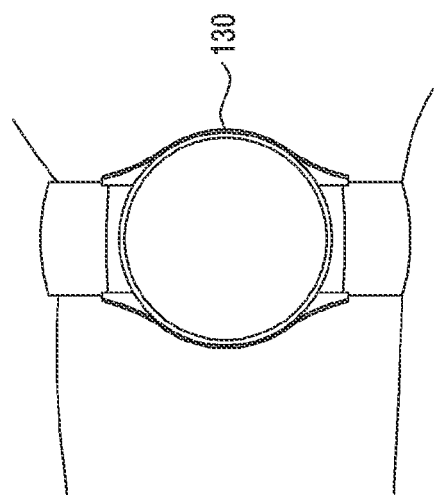
FIG. 1 illustrates an electronic device and a wearable device according to an example embodiment.
Figure 1:
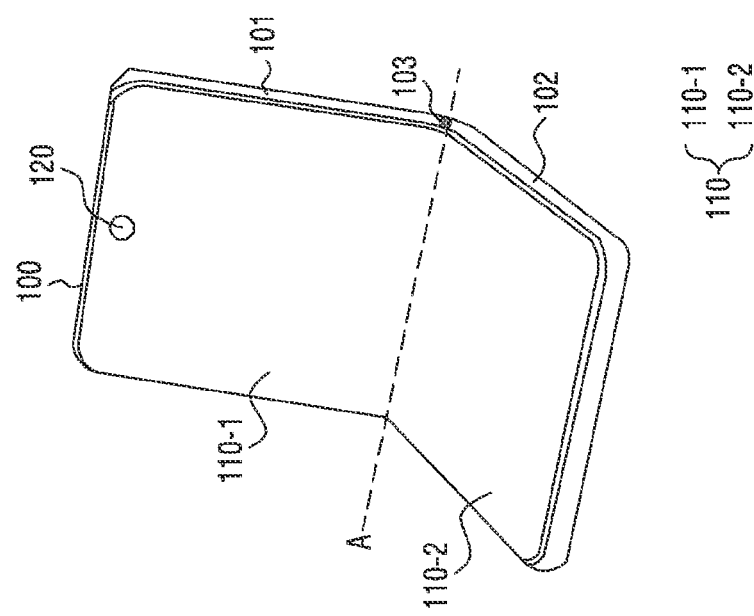

FIG. 1 illustrates an electronic device 100 and a wearable device 130 according to an embodiment.

Referring to FIG. 1, an electronic device 100 according to an embodiment may include a plurality of housings (e.g., a first housing 101 and a second housing 102), a connection member 103, a flexible display 110 (hereinafter, a "display" 110) disposed over one surface of the plurality of housings, and/or a camera 120. Hereinafter, the surface on which the display 110 is disposed will be defined as a first surface or a front surface of the electronic device 100. In addition, the opposite surface of the front surface will be defined as a second surface or a rear surface of the electronic device 100. In addition, a surface surrounding the space between the front surface and the rear surface will be defined as a third surface or a side surface of the electronic device 100. The electronic device 100 according to various example embodiments may refer to a device including a flexible or foldable display capable of implementing in-folding. The electronic device 100 is not limited to the above-described elements (e.g., the first housing 101, the second housing 102, the connection member (connector) 103, or the display 100) and may further include additional elements. For example, the electronic device 100 may further include a rear cover. As another example, at least some of the configurations of the electronic device 1901 illustrated in FIGS. 19A and 19B and the electronic device 2001 illustrated in FIG. 20 may be applied to the electronic device 100.

According to an embodiment, the plurality of housings may include a first housing 101 and a second housing 102. The plurality of housings of the electronic device 100 are not limited to the form and coupling shown in FIG. 1, and may be implemented in other forms or combinations and/or coupling of parts. For example, the first housing 101 may be integrally formed with the rear cover of the electronic device 100. As another example, the second housing 102 may also be integrally formed with the rear cover of the electronic device 100.

According to an embodiment, the connection member 103 may be disposed between the first housing 101 and the second housing 102 so as to be covered by a part of the first housing 101 and the second housing 102 or visually exposed to the outside according to a folded state or unfolded state of the electronic device 100. For example, when the electronic device 100 is in an unfolded state, the connection member 103 may be covered by a part of the first housing 101 and the second housing 102. As another example, when the electronic device 100 is in a folded state, the connection member/connector 103 may be visually exposed to the outside of the first housing 101 and the second housing 102.

According to an embodiment, the first housing 101 and the second housing 102 may form a space in which electronic components (e.g., a printed circuit board, a battery, or a processor) of the electronic device 100 may be disposed. For example, various types of components for performing various functions of the electronic device 100 may be disposed inside the first housing 101 and the second housing 102. As another example, electronic components such as a camera 120, a receiver, and at least one sensor (e.g., a millimeter wave sensor or a proximity sensor) may be disposed inside the first housing 100 and the second housing 102. Although not shown in FIG. 1, the above-described electronic components may be exposed through one surface (e.g., the front surface) of the electronic device 100 through at least one opening or recess located on the flexible display 110.

According to an embodiment, the flexible display 110 may include a first display area 110-1 and/or a second display area 110-2. The first display area 110-1 may be an area disposed on, directly or indirectly, one surface (e.g., the first surface or the front surface of the electronic device 100) of the first housing 101 in the display 110. The second display area 110-2 may be an area disposed on, directly or indirectly, one surface (e.g., the first surface or the front surface of the electronic device 100) of the second housing 102 in the display 110.

According to an embodiment, the electronic device 100 may be folded or unfolded about a folding axis A. For example, the electronic device 100 may perform an in-folding operation about the folding axis A. The in-folding operation may indicate that the first housing 101 and the second housing 102 move about the folding axis A such that the first display area 110-1 and the second display area 110-2 come into contact with each other.

According to an embodiment, the first housing 101 and the second housing 102 may have different angles or distances formed therebetween depending on an unfolded state, a folded state, or an intermediate state of the electronic device 100.

According to an embodiment, when the electronic device 100 is in the unfolded state, the first housing 101 and the second housing 102 may be arranged side by side. For example, when the electronic device 100 is in the unfolded state, the first housing 101 and the second housing 102 may be disposed such that a direction in which one surface of the first housing 101 is directed is substantially parallel to a direction in which one surface of the second housing 102 is directed.

According to an embodiment, when the electronic device 100 is in the folded state, the first housing 101 may pivot (or rotate) relative to the second housing 102 such that one surface of the first housing 101 faces one surface of the second housing 102. According to an embodiment, the intermediate state of the electronic device 100 may indicate the state in which an angle between the first housing 101 and the second housing 102 is within a certain range and in which one surface of the first housing 101 or the second housing 102 is parallel to the ground. For example, the intermediate state may indicate the state in which the angle between the first housing 101 and the second housing 102 is about 85 degrees to about 110 degrees and in which the second housing 102 is substantially parallel to the ground.

According to an embodiment, the state may be replaced with a mode.

According to an embodiment, the mode may indicate a mode configured in relation to the state of at least two or more housings disposed in the electronic device 100 (e.g., an angle between the housings).

According to an embodiment, when the electronic device 100 is in the intermediate state, it may enter a flex mode.

According to an embodiment, the electronic device 100, based on entering the flex mode, may display an execution screen of at least one application corresponding to the flex mode on the display 110. For example, when entering the flex mode, the electronic device 100 may display an always-on-display (AOD) standby screen.

According to an embodiment, the electronic device 100 may include a camera 120 (e.g., a front camera). The electronic device 100 may obtain an image of the user through the camera 120. The electronic device 100 may obtain user activity information, based on the obtained image of the user. For example, user activity information may include information related to user states (e.g., the state of doing nothing, stretching, typing on a keyboard, leaning toward a monitor, lying on a desk, or lying back while leaning on a chair).

According to an embodiment, the user activity information may include first user activity information and/or second user activity information. For example, the first user activity information may be user activity information obtained through the wearable device 130, and the second user activity information may be user activity information obtained through the electronic device 100. Means for obtaining the user activity information is not limited to the above-described examples, and the user activity information may also be obtained through at least one sensor (e.g., a millimeter wave (mmWave) sensor or a proximity sensor).

According to an embodiment, the electronic device 100 may be used to connect to the wearable device 130 using short-range wireless communication (e.g., Bluetooth, Bluetooth low energy (BLE), Wi-Fi direct, Wi-Fi hot spot, or ultra-wide band (UWB)) through a communication circuit. For example, the electronic device 100 may establish a short-range wireless communication connection with the wearable device 130 through Bluetooth. Although FIG. 1 shows a smartwatch as an example of the wearable device 130 connected to the electronic device 100 through short-range wireless communication, the disclosure is not limited thereto. For example, the wearable device connected to the electronic device 100 through short-range wireless communication may include wireless earphones (e.g., earbuds). The electronic device 100 may transmit and receive data to and from the wearable device 130 using short-range wireless communication.

According to an embodiment, the wearable device 130 may include an acceleration sensor (not shown) and an atmospheric pressure sensor (not shown). The wearable device 130 may obtain user activity information (e.g., first user activity information) using information obtained through the acceleration sensor and the atmospheric pressure sensor. The wearable device 130 may transmit the obtained user activity information to the electronic device 100 using short-range wireless communication through a communication circuit (not shown).

Figure 2:
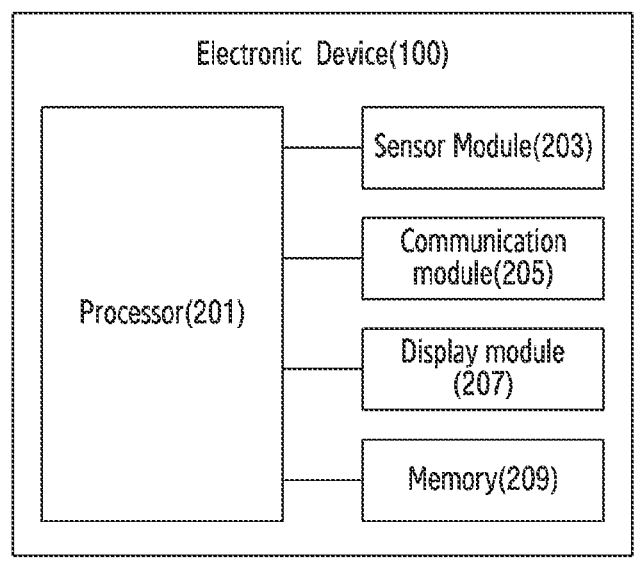
FIG. 2 is a block diagram of an electronic device according to an example embodiment.

FIG. 2 is a block diagram of an electronic device 100 according to an embodiment.

Referring to FIG. 2, an electronic device (e.g., the electronic device 100 in FIG. 1) may include a processor 201, a sensor module 203, a communication module 205, a display module 207, and/or a memory 209. Modules included in the electronic device 100 may be understood as hardware modules (e.g., circuits) included in the electronic device 100. The elements included in the electronic device 100 may not be limited to the elements (e.g., the processor 201, the sensor module 203, the communication module 205, the display module 207, and/or the memory 209) shown in FIG. 2. The elements of the electronic device 100 illustrated in FIG. 2 may be replaced with other elements, or additional elements may be added to the electronic device 100. For example, at least some of the configurations of the electronic device 1901 in FIGS. 19A and 19B and the electronic device 2001 in FIG. 20 may be applied to the electronic device 100 in FIGS. 1 and 2.

According to an embodiment, the processor 201 may execute instructions stored in the memory 209 to control the elements (e.g., the sensor module 203, the communication module 205, the display module 207, or a display), and/or memory 209) of the electronic device 100. The processor 201 may be electrically and/or operatively connected, directly or indirectly, to the sensor module 203, the communication module 205, the display module 207, and/or the memory 209. The processor 201 may execute software to control at least one other element (e.g., the sensor module 203, the communication module 205, the display module 207, and/or the memory 209) connected to the processor 201. The processor 201 may obtain commands from the elements included in the electronic device 100, interpret the obtained commands, and process various data and/or perform operation according to the interpreted commands.

According to an embodiment, the sensor module 203 (or at least one sensor 203) may include at least one of an inertial sensor, an acceleration sensor, an atmospheric pressure sensor, a millimeter wave (mmWave) sensor, or a proximity sensor.

According to an embodiment, the inertial sensor may obtain data related to the posture of the electronic device 100. For example, the electronic device 100 may determine an angle between the first housing 101 and the second housing 102 using information sensed through the inertial sensor. In an embodiment, the inertial sensor may be understood as a concept including an acceleration sensor, a gyro sensor, or a geomagnetic sensor. The inertial sensor or at least a portion of the inertial sensor may be disposed in the first housing 101 and the second housing 102, respectively. For example, the electronic device 100 may have a first inertial sensor in the first housing 101 and a second inertial sensor in the second housing 102.

According to an embodiment, the acceleration sensor may measure the intensity of an acceleration or impact related to the movement of the electronic device 100 (or the wearable device 130). For example, the wearable device 130 may obtain first user activity information using information about acceleration measured through the acceleration sensor.

According to an embodiment, the atmospheric pressure sensor may sense atmospheric pressure applied to the electronic device 100 (or the wearable device 130). For example, the wearable device 130 may obtain first user activity information using information about the atmospheric pressure sensed through the atmospheric pressure sensor.

According to an embodiment, the millimeter wave (mmWave) sensor may sense an object using radio waves (e.g., radio waves in a frequency band of 28 GHz, 39 GHz, 50 GHz, or 60 GHz). For example, the electronic device 100 may sense the presence of a user located around the electronic device 100 using information obtained through the millimeter wave sensor.

According to an embodiment, the proximity sensor may sense an object by emitting electromagnetic fields or electromagnetic waves (e.g., infrared rays). For example, the electronic device 100 may sense the presence of a user located around the electronic device 100 using information obtained through the proximity sensor.

According to an embodiment, the communication module 205 (or the communication circuit 205) may support communication between the electronic device 100 and an external device (e.g., the wearable device 130) using wired communication or wireless communication (e.g., Bluetooth (BT), Bluetooth Low Energy (BLE), or Wi-Fi). For example, the electronic device 100 may establish a communication connection with the wearable device 130 using short-range wireless communication (e.g., Bluetooth) through the communication module 205.

According to an embodiment, the display module 207 (or the flexible display 207) may visually provide (or output) data. For example, the display module 207 may visually provide (or output) data stored in the electronic device 100 or data obtained from the outside by the electronic device 100. The flexible display 207 indicates a bendable display and may be disposed over one surface of the first housing 101 and one surface of the second housing 102 of the electronic device 100. The flexible display 207 may be understood as a touch display including at least one of a touch sensor or a pressure sensor. For example, the flexible display 207 may obtain a user input through the touch sensor or the pressure sensor. At least a part of the configuration of the display module 207 may be applied to the flexible display 110 shown in FIG. 1.

According to an embodiment, the memory 209 may temporarily or non-temporarily store a variety of data used by the elements (e.g., the processor 201, the sensor module 203, the communication module 205, and/or the display module 207) of the electronic device 100. For example, the memory 209 may store user activity information (e.g., first user activity information and second user activity information) or user context information.

According to an embodiment, the wearable device 130 may have configuration that is at least partially identical to or similar to that of the electronic device 100 in FIG. 2.

Figure 3:
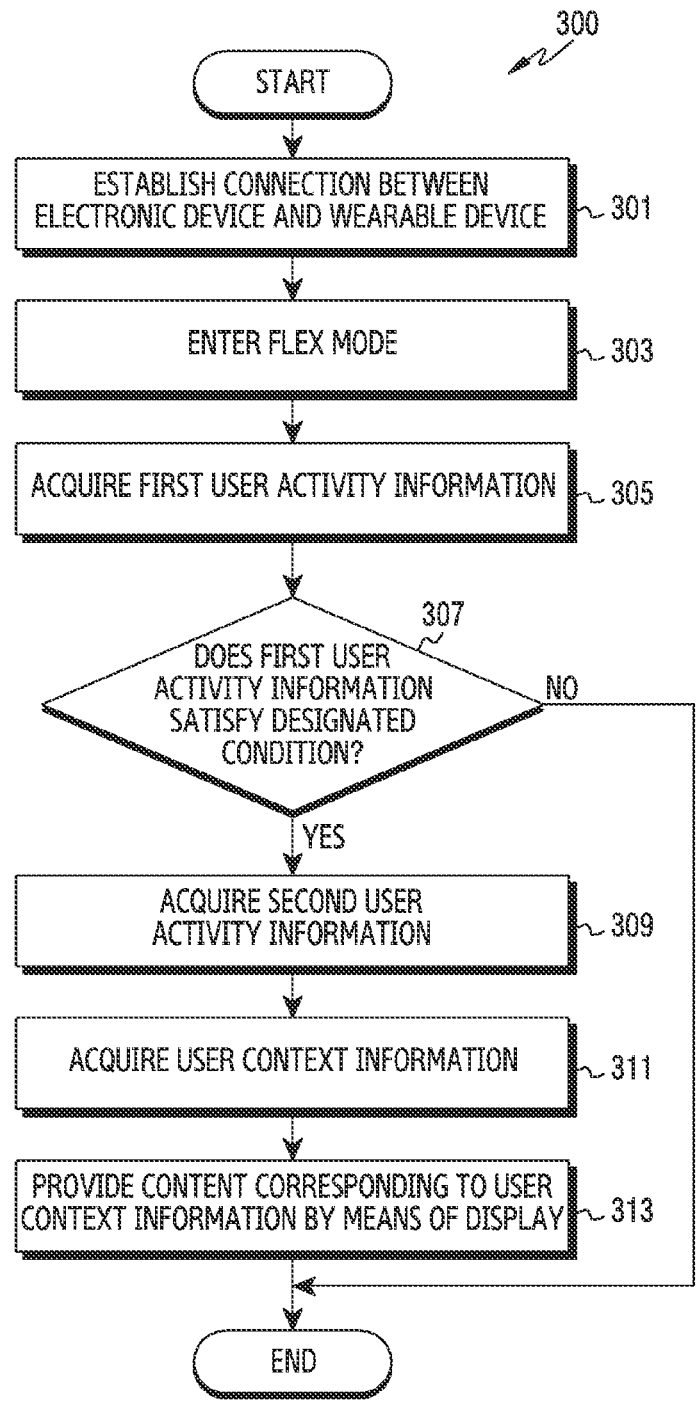
FIG. 3 is a flowchart illustrating an operation in which an electronic device obtains user context information according to an example embodiment.

FIG. 3 is a flowchart 300 illustrating an operation in which an electronic device 100 obtains user context information according to an embodiment.

A series of operations described below may be performed simultaneously or in a different order by the electronic device 100 or the wearable device 130, and some operations may be omitted or added.

Referring to FIG. 3, the electronic device 100 may obtain user context information, based on first user activity information and second user activity information, and display content corresponding to the obtained user context information through the display 207.

In operation 301 according to an embodiment, the electronic device 100 may connect with the wearable device 130. The electronic device 100 may perform a wireless communication connection with the wearable device 130 through the communication module (or communication circuit) 205. For example, the electronic device 100 may be connected to the wearable device 130 using a short-range wireless communication connection (e.g., Bluetooth, BLE, Zigbee, Wi-Fi, or UWB).

In operation 303 according to an embodiment, the electronic device 100 may enter a flex mode. In response to the case where the angle between the first housing 101 and the second housing 102 and the state thereof satisfy a predetermined condition, the electronic device 100 may enter (or switch to) the flex mode. The flex mode may indicate the state in which the angle between the first housing 101 and the second housing 102 is within a certain range and in which one surface of the first housing 101 or the second housing 102 is parallel to the ground. For example, the flex mode may indicate the state in which the angle between the first housing 101 and the second housing 102 is about 85 degrees to about 110 degrees and in which the second housing 102 is substantially parallel to the ground. For example, if the angle between the first housing 101 and the second housing 102 is about 100 degrees and if the second housing 102 is substantially parallel to the ground, the electronic device 100 may enter the flex mode.

According to an embodiment, the electronic device 100 may determine the angle between the first housing 101 and the second housing 102 through an inertial sensor. The electronic device 100 may determine the posture of the first housing 101 and the second housing 102 through the inertial sensor. The posture may vary depending on an angle between one surface of the first housing 101 and one surface of the second housing 102 and the ground. For example, one surface of the first housing 101 or one surface of the second housing 102 may be substantially parallel to the ground.

In operation 305 according to an embodiment, the electronic device 100 may obtain first user activity information. According to an embodiment, the electronic device 100 may receive first user activity information from the wearable device 130 through the communication module (or communication circuit) 205. The wearable device 130 may obtain first user activity information using information obtained through at least one of an acceleration sensor or an atmospheric pressure sensor. For example, user activity information may include information related to user states (e.g., the state of doing nothing, stretching, typing on a keyboard, leaning toward a monitor, lying on a desk, or lying back while leaning on a chair). The first user activity information may indicate the user activity information obtained by the wearable device 130.

According to an embodiment, the wearable device 130 may transmit the obtained first user activity information to the electronic device 100 through the communication circuit.

In operation 307 according to an embodiment, the electronic device 100 may determine whether or not the first user activity information satisfies a predetermined condition. The electronic device 100 may receive the first user activity information from the wearable device 130 through the communication module (or communication circuit) 205. In response to reception of the first user activity information, the electronic device 100 may determine whether or not the first user activity information satisfies a predetermined condition. The predetermined condition may be configured in the electronic device 100 or may be arbitrarily configured by a user. If the first user activity information satisfies the predetermined condition, the electronic device 100 may perform operation 309, and if the first user activity information does not satisfy the predetermined condition, the electronic device 100 may terminate the operation.

In operation 309 according to an embodiment, the electronic device 100 may obtain second user activity information. In response to determining that the first user activity information satisfies the predetermined condition, the electronic device 100 may drive (or operate) the sensor module 203 (or at least one sensor 203) in order to obtain second user activity information.

According to an embodiment, the electronic device 100 may obtain second user activity information using information obtained through at least one sensor 203. For example, the electronic device 100 may obtain second user activity information using information obtained through a millimeter wave sensor. As another example, the electronic device 100 may obtain second user activity information using image information obtained through the camera 120. As another example, the electronic device 100 may obtain second user activity information using information obtained through a proximity sensor. The second user activity information may be understood as the user activity information obtained by the electronic device 100.

In operation 311 according to an embodiment, the electronic device 100 may obtain user context information. The electronic device 100 may determine the user state by combining the first user activity information obtained from the wearable device 130 and the second user activity information obtained by the electronic device 100. Information related to the user state will be referred to as user context information. For example, the electronic device 100 may determine the user state (e.g., the state in which the user is typing while leaning toward a monitor), based on the first user activity information (e.g., the state in which the user is typing) obtained by the wearable device 130 through the acceleration sensor and the atmospheric pressure sensor, and the second user activity information (e.g., the state in which the user leans toward a monitor) obtained by the electronic device 100.

In operation 313 according to an embodiment, the electronic device 100 may provide content corresponding to the user context information through the display 207. The electronic device 100 may provide content corresponding to the user context information determined based on the first user activity information and the second user activity information through the display 207. The electronic device 100 may provide content corresponding to the user context information (e.g., the content shown in (a) of FIG. 18 or (b) of FIG. 18), as an AOD, through the display 207. For example, the electronic device 100 may provide an intensive mode user interface (UI) (e.g., (a) of FIG. 18), as an AOD, corresponding to the user context information indicating the state in which the user is typing while leaning toward a monitor. In various embodiments, the electronic device 100 may provide content, information, and a notification corresponding to the context information using another output means in addition to or instead of the display.

Figure 4:
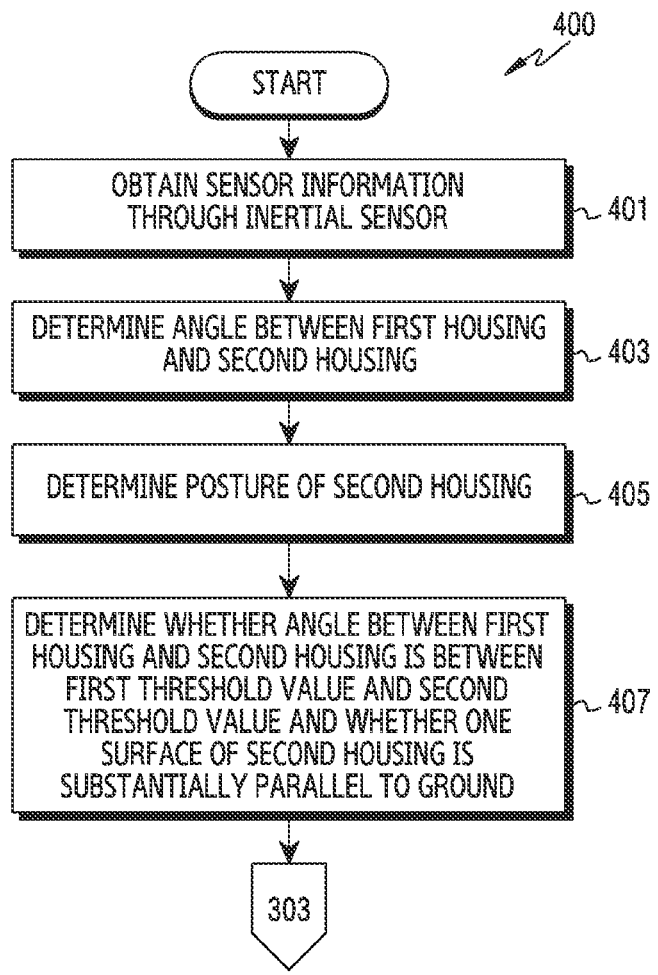
FIG. 4 is a flowchart illustrating an operation in which an electronic device enters a flex mode according to an example embodiment.

FIG. 4 is a flowchart 400 illustrating an operation in which an electronic device 100 enters a flex mode according to an embodiment.

A series of operations described below may be performed simultaneously or in a different order by the electronic device 100, and some operations may be omitted or added.

Referring to FIG. 4, the electronic device 100 may determine an angle between the first housing 101 and the second housing 102 using information obtained through a first inertial sensor included in the first housing 101 and a second inertial sensor included in the second housing 102. In response to the case where the determined angle satisfies a predetermined/designated condition, the electronic device 100 may enter a flex mode.

In operation 401 according to an embodiment, the electronic device 100 may obtain sensor information through at least one sensor. For example, the electronic device 100 may obtain sensor information through an inertial sensor. A first inertial sensor may be disposed in the first housing 101 of the electronic device 100, and a second inertial sensor may be disposed in the second housing 102 thereof. The electronic device 100 may obtain sensor information through the first inertial sensor and the second inertial sensor, respectively. The inertial sensor (e.g., the first inertial sensor and the second inertial sensor) may include a 6-axis sensor (e.g., an acceleration sensor and/or a gyro sensor) or a 9-axis sensor (e.g., an acceleration sensor, a gyro sensor, and/or a geomagnetic sensor).

In operation 403 according to an embodiment, the electronic device 100 may determine an angle between the first housing 101 and the second housing 102. The electronic device 100 determine the angle between the first housing 101 and the second housing 102 using sensor information obtained through the first inertial sensor disposed in the first housing 101 and the second inertial sensor disposed in the second housing 102. The first housing 101 may be understood as a housing disposed at the upper end of the electronic device 100, and the second housing 102 may be understood as a housing disposed at the lower end of the electronic device 100. The electronic device 100 may determine that the angle between the first housing 101 and the second housing 102 is about 100 degrees, based on the sensor information obtained through the first inertial sensor and the second inertial sensor.

In operation 405 according to an embodiment, the electronic device 100 may determine the posture of the second housing 102. The electronic device 100 may determine the posture of the second housing 102 using information obtained through at least one sensor 203 (e.g., the second inertial sensor). Although not shown in FIG. 4, the posture of the first housing 101 may also be determined using information obtained through at least one sensor 203 (e.g., the first inertial sensor). The electronic device 100 may enter a flex mode if one surface of the second housing 102 is parallel to the ground, using the information obtained through the second inertial sensor disposed in the second housing 102.

In operation 407 according to an embodiment, the electronic device 100 may determine whether or not the angle between the first housing 101 and the second housing 102 is between a first threshold value and a second threshold value and whether or not one surface of the second housing 102 is substantially parallel to the ground. If the angle between the first housing 101 and the second housing 102 is between a first threshold value (e.g., about 85 degrees) and a second threshold value (e.g., about 110 degrees) and if one surface of the second housing 102 is substantially parallel to the ground, the electronic device 100 may perform operation 303. For example, if the angle between the first housing 101 and the second housing 102 is about 100 degrees between the first threshold value of about 85 degrees and the second threshold value of about 110 degrees, the electronic device 100 may enter the flex mode. The electronic device 100 in the flex mode may provide content corresponding to user context information through the display 207.

Figure 5:
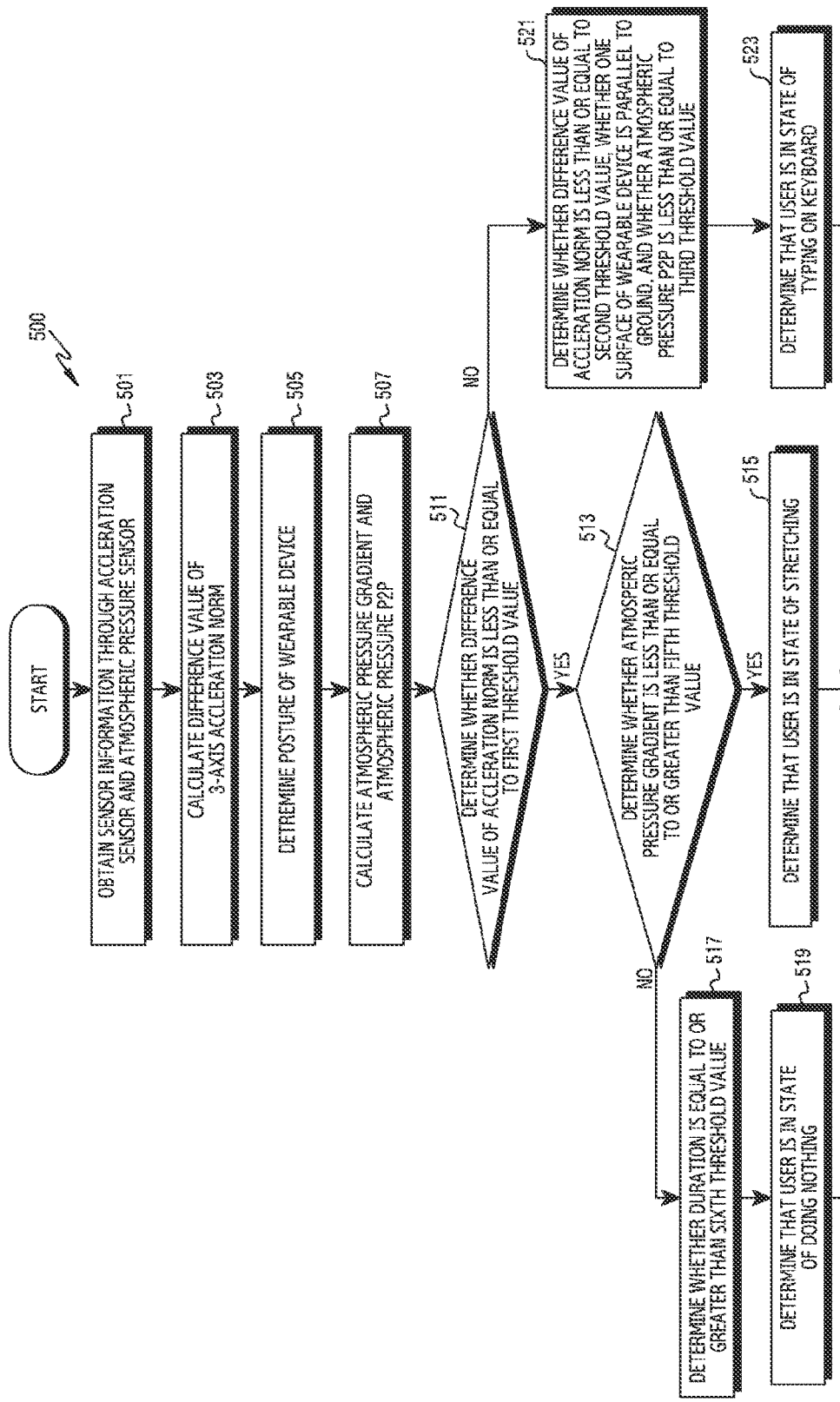
FIG. 5 is a flowchart illustrating an operation in which a wearable device obtains first user activity information according to an example embodiment.

FIG. 5 is a flowchart 500 illustrating an operation in which a wearable device 130 obtains first user activity information according to an embodiment.

A series of operations described below may be performed simultaneously or in a different order by the wearable device 130, and some operations may be omitted or added.

Referring to FIG. 5, the wearable device 130 may obtain first user activity information indicating the user state (e.g., the state of doing nothing, stretching, or typing on a keyboard) using sensor information obtained through an acceleration sensor and an atmospheric pressure sensor.

In operation 501 according to an embodiment, the wearable device 130 may obtain sensor information through an acceleration sensor and an atmospheric pressure sensor, respectively. For example, the wearable device 130 may obtain acceleration information on the user's body (e.g., wrist) through the acceleration sensor. As another example, the wearable device 130 may obtain atmospheric pressure information on the user's body (e.g., wrist) through the atmospheric pressure sensor.

In operation 503 according to an embodiment, the wearable device 130 may calculate a difference value of a 3-axis acceleration norm. For example, the wearable device 130 may calculate a difference value of the 3-axis acceleration norm using sensor information (or acceleration information) obtained through the acceleration sensor. The 3-axis acceleration norm is the magnitude of the acceleration of x-, y-, and z-axes, and the difference value may indicate a signal obtained by subtracting a previous norm value from a current norm value.

In operation 505 according to an embodiment, the wearable device 130 may determine the posture of the wearable device 130 using the acceleration information obtained in operation 503. The wearable device 130 may determine a direction in which one surface (e.g., the surface on which the display is disposed) of the wearable device 130 is directed using acceleration z-axis information among the acceleration information. For example, the wearable device 130 may determine that the surface on which the display of the wearable device 130 is disposed faces in the opposite direction of the ground using the acceleration z-axis information among the acceleration information. The wearable device 130 may determine whether an acceleration z-axis value among the acceleration information is equal to or greater than a threshold value. If the wearable device 130 determines that the acceleration z-axis value is equal to or greater than the threshold value, the wearable device 130 may determine that one surface (e.g., the surface on which the display is disposed) of the wearable device 130 faces in the opposite direction of the ground (e.g., the direction toward the sky).

In operation 507 according to an embodiment, the wearable device 130 may calculate an atmospheric pressure gradient and an atmospheric pressure peak2peak (p2p) value. The atmospheric pressure gradient may be determined by calculating the gradient of an atmospheric pressure signal within a window of a predetermined length. The atmospheric pressure p2p value may be determined by calculating a difference between a maximum or high peak value (e.g., maximum value) and a minimum or low valley value (e.g., minimum value) of a signal within a window of a predetermined length.

In operation 511 according to an embodiment, the wearable device 130 may determine whether a difference value of the acceleration norm is less than or equal to a first threshold value. If the difference value of the acceleration norm is less than or equal to the first threshold value, the wearable device 130 may perform operation 513, otherwise, the wearable device 130 may perform operation 521.

In operation 513 according to an embodiment, if the difference value of the acceleration norm is less than or equal to the first threshold value, the wearable device 130 may determine whether or not the atmospheric pressure gradient is less than or equal to a fourth threshold value and whether or not the atmospheric pressure p2p value is equal to or greater than a fifth threshold value. The case where the difference value of the acceleration norm is less than or equal to the first threshold value may be understood as the state in which the user wearing the wearable device 130 hardly moves his or her hands. If the atmospheric pressure gradient is less than or equal to the fourth threshold value and if the atmospheric pressure p2p value is equal to or greater than the fifth threshold value, the wearable device 130 may perform operation 515, otherwise, the wearable device 130 may perform operation 517.

In operation 515 according to an embodiment, if the atmospheric pressure gradient is less than or equal to the fourth threshold value and if the atmospheric pressure p2p value is equal to or greater than the fifth threshold value, the wearable device 130 may determine that the user is in the state of stretching by user's hands being raised over his or her head. In operation 305 in FIG. 3, based on the determination of the user state, the wearable device 130 may obtain first user activity information indicating the state in which the user is stretching by the user's hands being raised over his or her head.

In operation 517 according to an embodiment, the wearable device 130 may determine whether or not the state in which the condition of operation 513 is not satisfied continues for a predetermined time or longer. For example, the wearable device 130 may determine whether the duration of the state in which the condition of operation 513 is not satisfied is equal to or greater than a sixth threshold value.

In an embodiment, the state in which the wearable device 130 does not satisfy the condition of operation 513 may indicate the state in which the atmospheric pressure gradient is greater than or equal to the fourth threshold value or the state in which the atmospheric pressure p2p value is less than or equal to the fifth threshold value.

In operation 519 according to an embodiment, if the duration of the state in which the condition of operation 513 is not satisfied is equal to or greater than the sixth threshold value, the wearable device 130 may determine that the user is in the state of doing nothing. In operation 305 in FIG. 3, based on the determination of the user state, the wearable device 130 may obtain first user activity information indicating the state in which the user is doing nothing.

In operation 521 according to an embodiment, if the condition of operation 511 is not satisfied (if the difference value of the acceleration norm is equal to or greater than the first threshold value), the wearable device 130 may determine whether or not the difference value of the acceleration norm is less than or equal to a second threshold value, whether or not one surface of the wearable device 130 is parallel to the ground, and whether or not the atmospheric pressure p2p value is less than or equal to a third threshold value.

In operation 523 according to an embodiment, if the condition of operation 521 is satisfied, the wearable device 130 may determine that the user is in the state of typing on a keyboard. In operation 305 in FIG. 3, based on the determination of the user state, the wearable device 130 may obtain first user activity information indicating the state in which the user is typing on a keyboard.

Figure 6A:
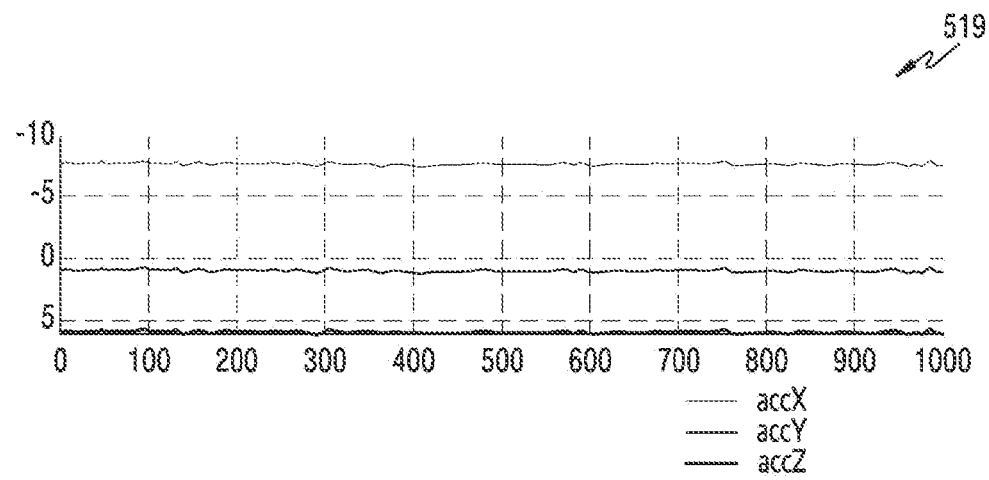
FIGS. 6(a)-(c) illustrate graphs of first user activity information obtained by a wearable device according to an example embodiment.
Figure 6B:
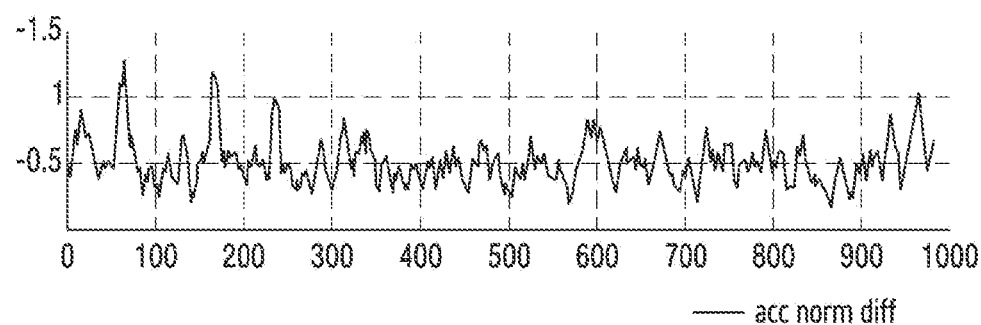
Figure 6C:
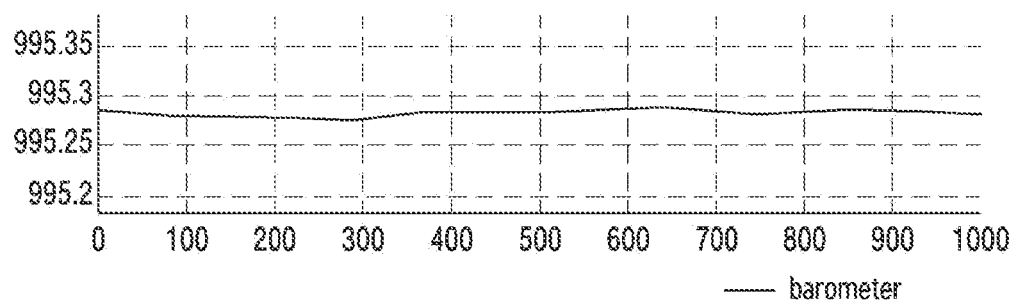

FIG. 6 illustrates a graph of first user activity information obtained by a wearable device 130 according to an embodiment.

Referring to FIG. 6, when the wearable device 130 determines that the user is in the state of doing nothing (operation 519 in FIG. 5), data obtained using an acceleration sensor and an atmospheric pressure sensor and patterns of graphs thereof may be identified through the graph (a) in FIG. 6, the graph (b) in FIG. 6, and the graph (c) in FIG. 6.

In the graphs (a) to (c) in FIG. 6, the horizontal axis may indicate the number of samples. In various embodiments, samples may be obtained in units of 10 ms, and in this case, 100 samples may correspond to 1 second.

According to an embodiment, the graph (a) in FIG. 6 shows acceleration data of x, y, and z-axes obtained by the acceleration sensor of the wearable device 130. When the user is in the state of doing nothing, the graph (a) in FIG. 6 shows a pattern having no significant change except for fluctuations of a noise level.

According to an embodiment, the graph (b) in FIG. 6 shows data of a difference value of the acceleration norm obtained by the acceleration sensor of the wearable device 130. When the user is in the state of doing nothing, the graph (b) in FIG. 6 shows a pattern in which the difference value of the acceleration norm is less than or equal to a certain level (e.g., the point at which the y-axis is 1 in the graph (b) of FIG. 6).

According to an embodiment, the graph (c) in FIG. 6 shows atmospheric pressure data obtained through the atmospheric pressure sensor of the wearable device 130. When the user is in the state of doing nothing, the graph (c) in FIG. 6 shows a pattern having no significant change except for fluctuations of a noise level.

Referring to FIGS. 5 and 6, if the duration of conditions in which the difference value of the acceleration norm is less than or equal to a first threshold value (e.g., the point at which the y-axis is 1 in the graph (b) of 6), and in which the atmospheric pressure gradient is greater than or equal to a fourth threshold value, or in in which the atmospheric pressure p2p value is less than or equal to a fifth threshold value is equal to or greater than a sixth threshold value, the wearable device 130 may obtain first user activity information indicating the state in which the user is doing nothing.

Figure 7A:
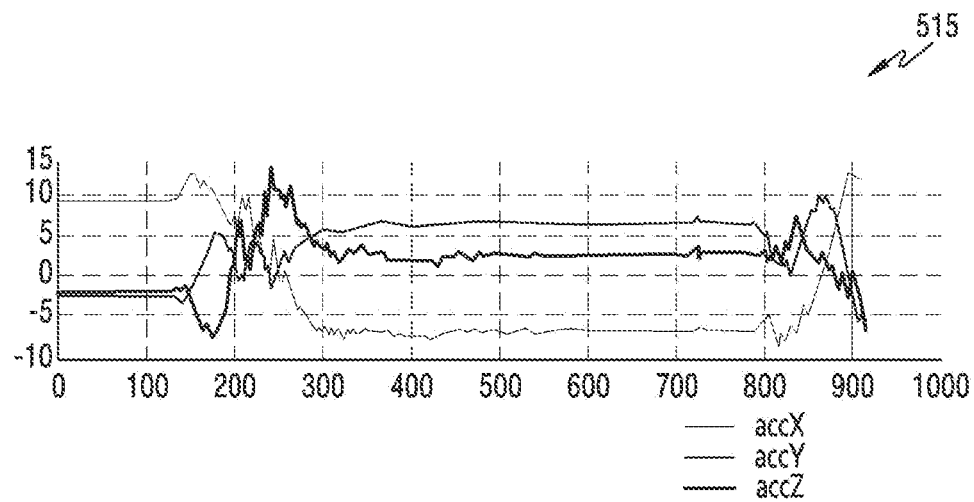
FIGS. 7(a)-(c) illustrate graphs of first user activity information obtained by a wearable device according to an example embodiment.
Figure 7B:
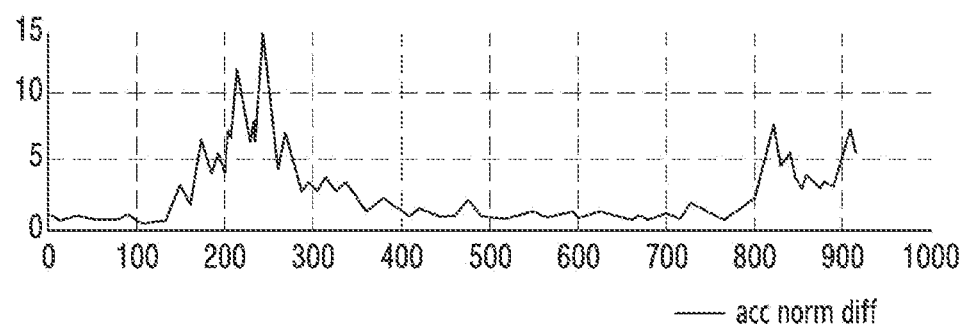
Figure 7C:
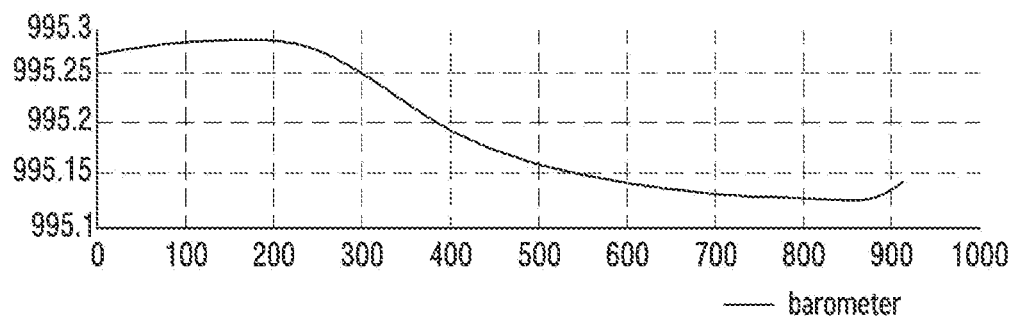

FIG. 7 illustrates a graph of first user activity information obtained by a wearable device 130 according to an embodiment.

Referring to FIG. 7, when the wearable device 130 determines that the user is in the state of stretching (operation 515 in FIG. 5), data obtained using an acceleration sensor and an atmospheric pressure sensor and patterns of graphs thereof may be identified through the graph (a) in FIG. 7, the graph (b) in FIG. 7, and the graph (c) in FIG. 7.

In the graphs (a) to (c) in FIG. 7, the horizontal axis may indicate the number of samples. In various embodiments, samples may be obtained in units of 10 ms, and in this case, 100 samples may correspond to 1 second. According to an embodiment, the graph (a) in FIG. 7 shows acceleration data of x, y, and z-axes obtained by the acceleration sensor of the wearable device 130. When the user is in the state of stretching, the graph (a) in FIG. 7 shows a pattern according to the wearable device 130 that is displaced from bottom to top.

According to an embodiment, the graph (b) in FIG. 7 shows data of a difference value of the acceleration norm obtained by the acceleration sensor of the wearable device 130. Since the user's hand stops for a certain time when the user is in the state of stretching, the graph (b) in FIG. 7 shows a pattern in which the difference value of the acceleration norm is less than or equal to a certain level (e.g., the point at which the y-axis is 1 in the graph (b) of 7).

According to an embodiment, the graph (c) in FIG. 7 shows atmospheric pressure data obtained through the atmospheric pressure sensor of the wearable device 130. The graph (c) in FIG. 7 shows a pattern in which the atmospheric pressure gradient is negative and in which the atmospheric pressure changes significantly over a certain level as the wearable device 130 is displaced from bottom to top when the user is in the state of stretching.

Referring to FIGS. 5 and 7, if the difference value of the acceleration norm is less than or equal to a first threshold value (e.g., the point at which the y-axis is 1 in the graph (b) of 7), if the atmospheric pressure gradient is less than or equal to a fourth threshold value, and if the atmospheric pressure p2p value is equal to or greater than a fifth threshold value (e.g., if the atmospheric pressure gradient is negative and if the atmospheric pressure changes significantly more than a certain level), the wearable device 130 may obtain first user activity information indicating the state in which the user is stretching.

Figure 8A:
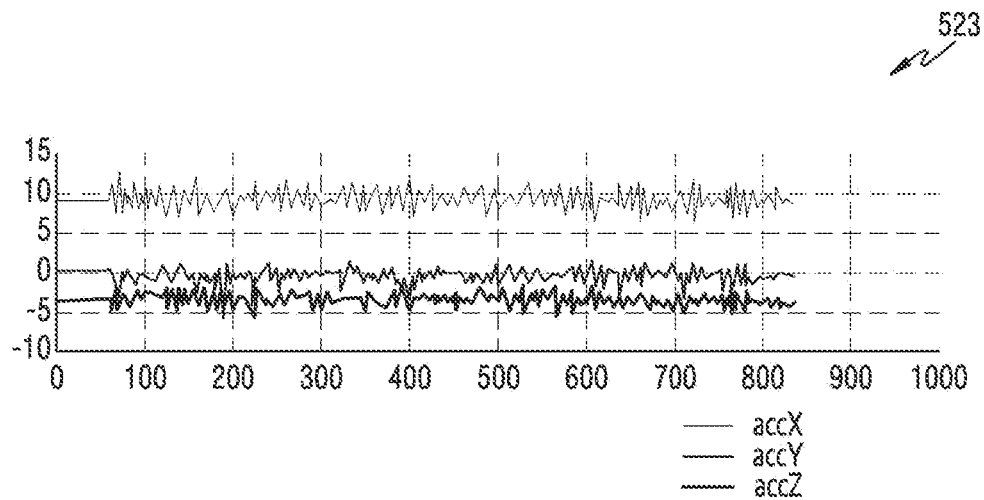
FIGS. 8(a)-(c) illustrate graphs of first user activity information obtained by a wearable device according to an example embodiment.
Figure 8B:
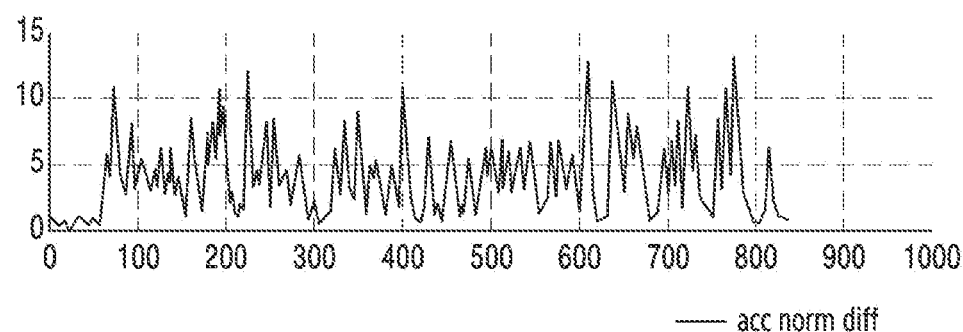
Figure 8C:
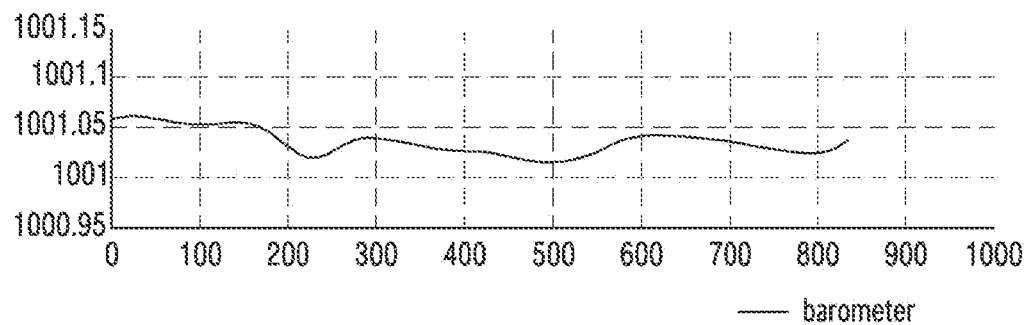

FIG. 8 illustrates a graph of first user activity information obtained by a wearable device 130 according to an embodiment.

Referring to FIG. 8, when the wearable device 130 determines that the user is in the state of typing on a keyboard (operation 523 in FIG. 5), data obtained using an acceleration sensor and an atmospheric pressure sensor and patterns of graphs thereof may be identified through the graph (a) in FIG. 8, the graph (b) in FIG. 8, and the graph (c) in FIG. 8.

In the graphs (a) to (c) in FIG. 8, the horizontal axis may indicate the number of samples. In various embodiments, samples may be obtained in units of 10 ms, and in this case, 100 samples may correspond to 1 second.

According to an embodiment, the graph (a) in FIG. 8 shows acceleration data of x, y, and z-axes obtained by the acceleration sensor of the wearable device 130. When the user is in the state of typing on a keyboard, the graph (a) in FIG. 8 shows a pattern of unspecified impacts. For example, when the user is typing on a keyboard, in the graph (a) in FIG. 8, an acceleration value of x-axis and an acceleration value of y-axis have unspecified patterns, based on an acceleration value of z-axis, which is about 9.8G.

According to an embodiment, the graph (b) in FIG. 8 shows data of a difference value of the acceleration norm obtained by the acceleration sensor of the wearable device 130. When the user is in the state of typing on a keyboard, the graph (b) in FIG. 8 shows a pattern in which the difference value of the acceleration norm is within a certain range (e.g., 3G to 10G).

According to an embodiment, the graph (c) in FIG. 8 shows atmospheric pressure data obtained through the atmospheric pressure sensor of the wearable device 130. When the user is in the state of typing on a keyboard, the graph (c) in FIG. 8 shows a pattern having no significant change except for fluctuations of a noise level.

Referring to FIGS. 5 and 8, if the difference value of the acceleration norm is equal to or greater than a first threshold value and less than or equal to a second threshold value (e.g., the difference value of the acceleration norm is within a certain range (e.g., 3G to 10G) in the graph (b) of FIG. 8), if one surface of the wearable device 130 is parallel to the ground (e.g., an acceleration value of z-axis is maintained at a reference value of about 9.8G in the graph (a) of FIG. 8), and if the atmospheric pressure p2p value is less than or equal to a third threshold value, the wearable device 130 may obtain first user activity information indicating the state in which the user is typing on a keyboard.

Figure 9:
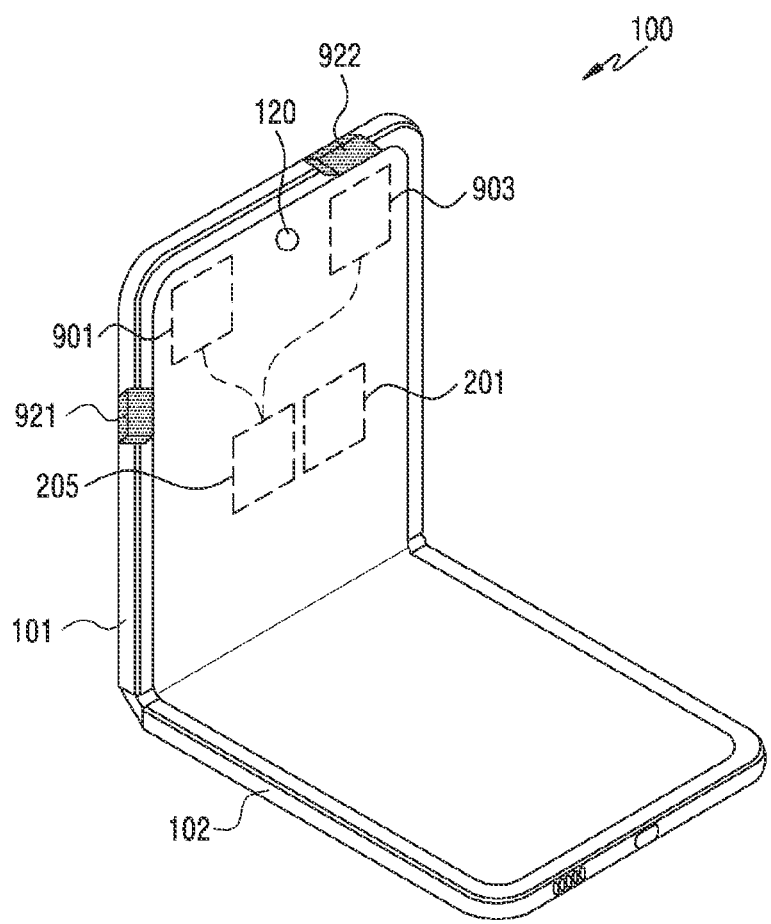
FIG. 9 illustrates arrangement of a millimeter wave sensor inside an electronic device according to an example embodiment.

FIG. 9 illustrates arrangement of a millimeter wave sensor inside an electronic device 100 according to an embodiment.

Referring to FIG. 9, the electronic device 100 may include a millimeter wave sensor (or millimeter wave radar). The millimeter wave sensor may include a Tx antenna module 901 and/or an Rx antenna module 903. The Tx antenna module 901 and the Rx antenna module 903 may be connected to the communication circuit 205. The Tx antenna module 901 and the Rx antenna module 903 may be mounted to upper corners of the first housing 101, respectively. According to an embodiment, the Tx antenna module 901 and the Rx antenna module 903 may be disposed in a bezel area (e.g., a first area 921 or a second area 922) of the first housing 101 or the second housing 102. For example, the Tx antenna module 901 may be disposed in the first area 921, and the Rx antenna module 903 may be disposed in the second area 922. The Tx antenna module 901 and the Rx antenna module 903 may be connected to the communication circuit 205 in order to process signals transmitted and/or received therethrough. The processor 201 may control and/or process the millimeter wave sensor (e.g., the Tx antenna module 901 and/or the Rx antenna module 903).

Figure 10:
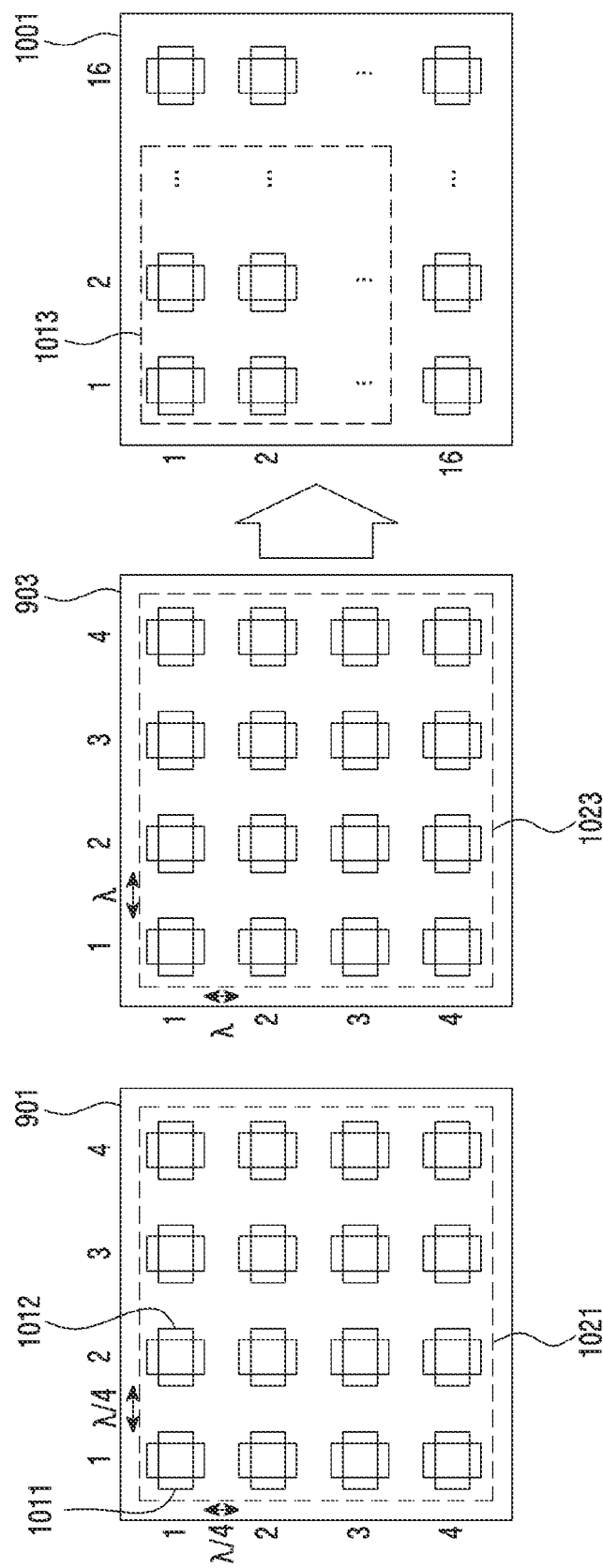
FIG. 10 illustrates a virtual antenna array of a millimeter wave sensor according to an example embodiment.

FIG. 10 illustrates a virtual antenna array of a millimeter wave sensor according to an embodiment.

FIG. 10 illustrates a virtual antenna array for a millimeter wave sensor (e.g., millimeter wave radar) to sense (or detect) a radio wave (e.g., a radio wave in a frequency band of 28 GHz, 39 GHz, 50 GHz, or 60 GHz).

According to an embodiment, the Tx antenna module 901 (comprising at least one antenna) and the Rx antenna module 903 may include an array antenna including an array of 4×4 antenna elements 1021 and 1023, respectively. The virtual antenna array 1001 may be produced using the Tx antenna module 901 and the Rx antenna module 903. For example, the virtual antenna array 1001 of 16×16 may be produced using the Tx antenna module 901 of 4×4 array and the Rx antenna module 903 of 4×4 array. The electronic device 100 may monitor the user using the produced virtual antenna array 1001.

Although FIG. 10 shows the Tx antenna module 901 and/or Rx antenna module 903 of 4×4 array, the array of antenna elements constituting each of the Tx antenna module and/or Rx antenna module for transmitting and/or receiving a signal in which the resolution of an image obtained to monitor the user using the virtual antenna array 1001 satisfies a specified value may not be limited thereto. For example, the Tx antenna module may be mounted in one row on the left or right edge (e.g., the first area 921) of the first housing 101, and the Rx antenna module may be mounted in one row on the upper edge (e.g., the second area 922) of the first housing 101.

According to an embodiment, the array of antenna elements 1021 constituting the Tx antenna module 901 may be 4×4. In an embodiment, the antenna elements 1021 may be disposed so as to be spaced a predetermined distance (e.g., $\lambda/4$) apart from each other.

According to an embodiment, the array of antenna elements 1023 constituting the Rx antenna module 903 may be 4×4. In an embodiment, the antenna elements 1023 may be disposed so as to be spaced a predetermined distance (e.g., $\lambda$) apart from each other.

According to an embodiment, when the electronic device 100 transmits a signal from the antenna element 1011 at the position (1, 1) using the Tx antenna module 901, the signal may be received by the antenna elements 1023 at 16 positions (e.g., (1, 1) to (4, 4)) using the Rx antenna module 903 of 4×4 array. The electronic device 100 may store the received signal (or a value of the signal) in the positions (1:4, 1:4) 1001 of the virtual antenna array.

According to an embodiment, when the electronic device 100 transmits a signal from the antenna element 1012 at the position (1, 2) using the Tx antenna module 901, the signal may be received by the antenna elements 1023 at 16 positions (e.g., (1, 1) to (4, 4)) using the Rx antenna module 903 of 4×4 array. The electronic device 100 may store the received signal (or a value of the signal) in the positions (1:4, 5:8) of the virtual antenna array.

Figure 11A:
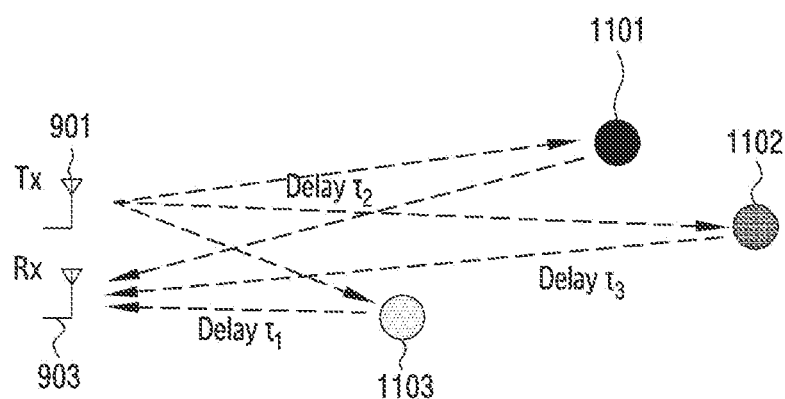
FIGS. 11(a)-(b) illustrate a principle of operation of a millimeter wave sensor according to an example embodiment.
Figure 11B:

FIG. 11 illustrates a principle of operation of a millimeter wave sensor according to an embodiment.

According to an embodiment, the electronic device 100 may monitor the state of a user, based on the operation principle of a millimeter wave sensor according to the description made with reference to (a) of FIG. 11 and (b) of FIG. 11. For example, the electronic device 100 may monitor the user state (e.g., second user activity information) through a sensor module (e.g., the sensor module 203 in FIG. 2 comprising at least one sensor) (e.g., a millimeter wave sensor). For example, the electronic device 100 may determine the user state (or posture), based on information of depths (or distances) from the electronic device 100 to objects (e.g., a first object 1101, a second object 1102, and a third object 1103), which is obtained through the millimeter wave sensor. The electronic device 100 may determine the user's concentration on work, based on the determined user state (or posture).

Referring to (a) of FIG. 11, the delay time produced when a radio wave transmitted from the Tx antenna module (e.g., the Tx antenna module 901 in FIGS. 9 and 10) is reflected from the objects (e.g., the first object 1101, the second object 1102, and the third object 1103) to then be received by the Rx antenna module (e.g., the Rx antenna module 903 in FIGS. 9 and 10, comprising at least one antenna) may vary depending on the distance between the electronic device 100 to the objects. For example, the longer the distance from the electronic device 100 to the object, the longer the delay time, and the shorter the distance, the shorter the delay time. For example, the delay time may be longer in the order of the second object 1102 having a longest distance to the electronic device 100, the first object 1101, and the third object 1103.

According to an embodiment, the electronic device 100 may transmit a radio wave (e.g., a radio wave in a frequency band of 28 GHz, 39 GHz, 50 GHz, or 60 GHz) to the first object 1101, the second object 1102, and the third object 1103 through the Tx antenna module 901. The electronic device 100 may receive radio waves reflected from the first object 1101, the second object 1102, and the third object 1103 through the Rx antenna module 903.

Referring to (b) of FIG. 11, when the radio wave transmitted from the Tx antenna module 901 is reflected by the objects and received by the Rx antenna module 903, the magnitude (or amplitude) of the received radio wave (e.g., an impulse signal) may vary depending on the distance from the electronic device 100 to the object. For example, the magnitude of the impulse signal reflected from the objects and received by the Rx antenna module 903 may increase as the distance between the electronic device 100 and the object is reduced, and decrease as the distance increases. For example, when there is no delay time (or when t is 0), the magnitude of the received impulse signal may be a first magnitude 1111. As another example, when the delay time corresponding to the distance between the electronic device 100 and the third object 1103 is $\tau 1$, the magnitude of the impulse signal received by the Rx antenna module 903 may be a second magnitude 1103a. As another example, when the delay time corresponding to the distance between the electronic device 100 and the first object 1101 is $\tau 2$, the magnitude of the impulse signal received by the Rx antenna module 903 may be a third magnitude 1101a. As another example, when the delay time corresponding to the distance between the electronic device 100 and the second object 1102 is $\tau 3$, the magnitude of the impulse signal received by the Rx antenna module 903 may be a fourth magnitude 1102a.

Figures 12A, 12B:
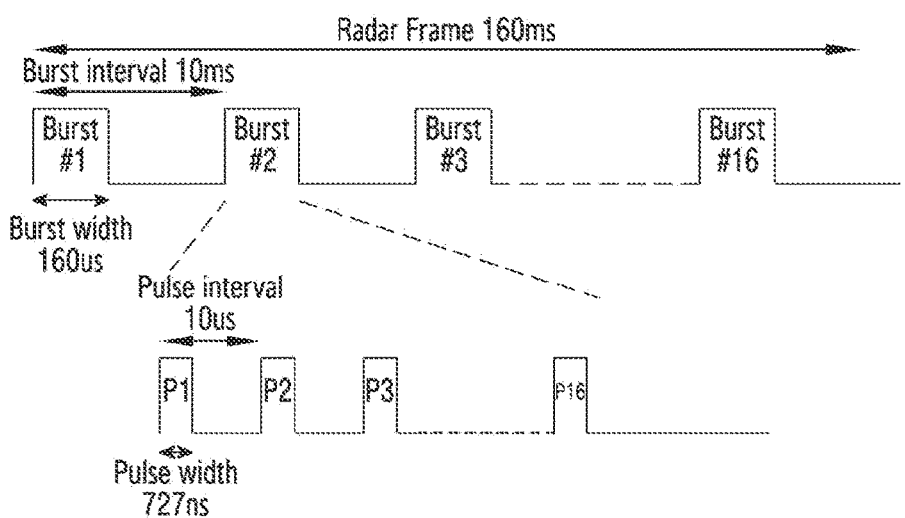
FIGS. 12(a)-(b) illustrate a structure of a millimeter wave sensor signal according to an example embodiment.

FIG. 12 illustrates a structure of a millimeter wave sensor signal according to an embodiment.

Referring to FIG. 12, an image frame structure for a millimeter wave sensor (or radar) signal having an array of 16×16 will be described below. Referring to (a) in FIG. 12, one radar image frame may include 16 burst signals (e.g., burst signal 201 to burst signal 2016). For example, in the case where the interval of one burst signal is about 10 ms, it may take about 160 ms for the electronic device 100 to capture one radar image for monitoring the user. The width of one burst signal may be about 160 us.

Referring to (a) and (b) in FIG. 12, one burst signal received by an Rx antenna module (e.g., the Rx antenna module 903 in FIG. 9) for a signal transmitted from one antenna element included in a Tx antenna module (e.g., the Tx antenna module 901 in FIG. 9) may include a plurality of pulse signals. For example, one burst signal may include 16 pulse signals. The interval of the pulse may be about 10 us. The width of the pulse may be about 727 ns.

Figure 13A:
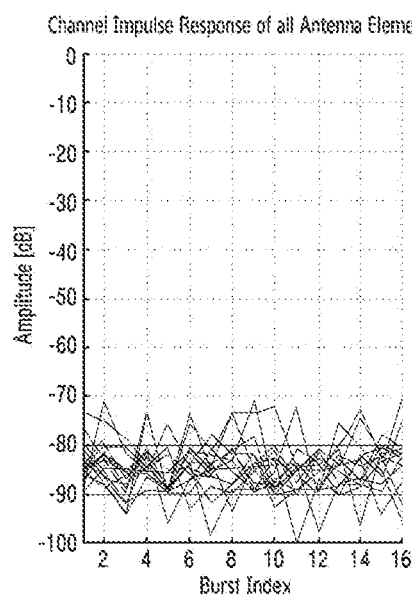
FIGS. 13(a)-(b) are graphs illustrating second user activity information according to an example embodiment.
Figure 13B:
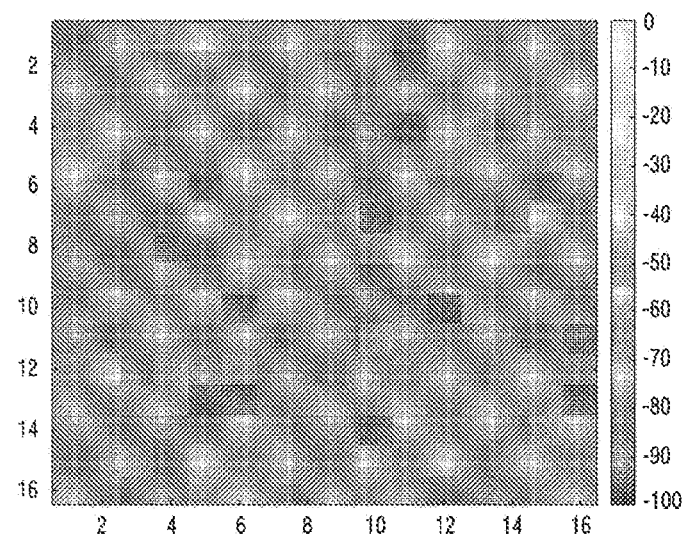

FIG. 13 is a graph illustrating second user activity information according to an embodiment.

(a) of FIG. 13 illustrates a graph of data sensed by the electronic device 100 through a millimeter wave (or radar) sensor when there is nothing in front of the electronic device 100. For example, when there is nothing in front of the electronic device 100 having switched to a flex mode, (a) of FIG. 13 shows a channel impulse response (CIR) for all burst signals in one radar image frame, and the amplitude may be maintained at about −70 dB or less.

(b) of FIG. 13 is a two-dimensional heat map showing a radar image obtained by the electronic device 100 using a virtual antenna array when there is nothing in front of the electronic device 100.

Figures 14A, 14B:
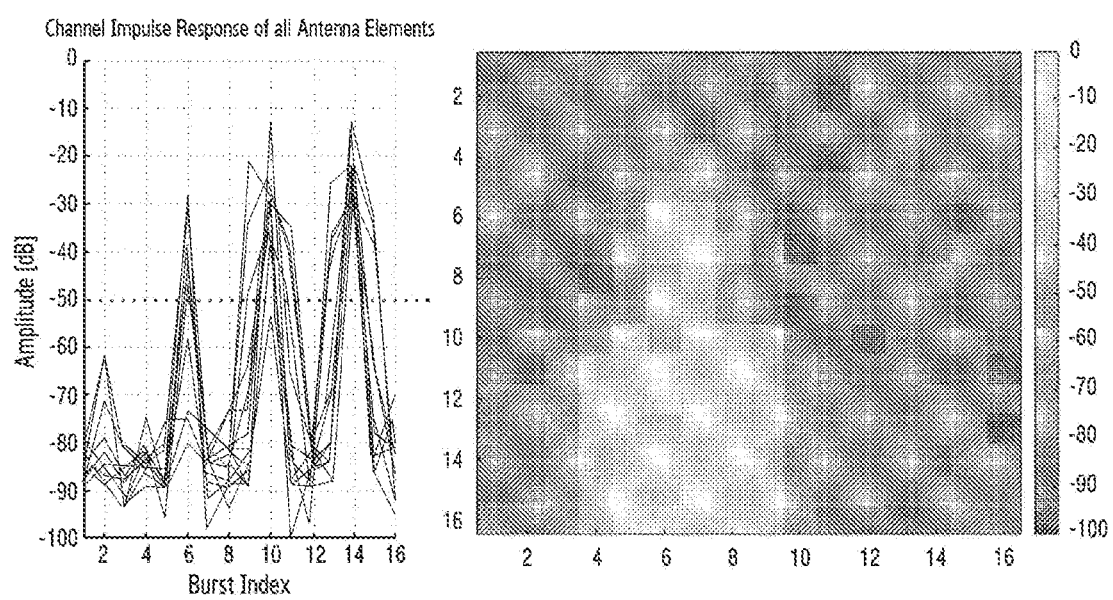
FIGS. 14(a)-(b) are graphs illustrating second user activity information according to an example embodiment.

FIG. 14 is a graph illustrating second user activity information according to an embodiment.

(a) of FIG. 14 illustrates a graph of data sensed by the electronic device 100 through a millimeter wave sensor when there is a person in front of the electronic device 100. For example, when there is a person (e.g., a user) in front of the electronic device 100 having switched to a flex mode, (a) of FIG. 14 shows a channel impulse response (CIR) for all burst signals in one radar image frame, and the amplitude of the part where a person is sensed may be maintained at about −50 dB or more.

(b) of FIG. 14 is a two-dimensional heat map showing a radar image obtained by the electronic device 100 using a virtual antenna array when there is a person in front of the electronic device 100.

According to an embodiment, the electronic device 100 may obtain second user activity information through at least one of a burst signal having an amplitude equal to or greater than a threshold value or a heat map. For example, the electronic device 100 may obtain second user activity information indicating the state (or posture) of the user located in front of the electronic device 100 through at least one of a burst signal having an amplitude equal to or greater than a threshold value or a heat map.

According to various embodiments, the electronic device 100 may use various devices, as well as the millimeter wave sensor, to obtain the second user activity information. For example, the electronic device 100 may obtain the second user activity information through the camera 120 or a proximity sensor.

Figure 15:
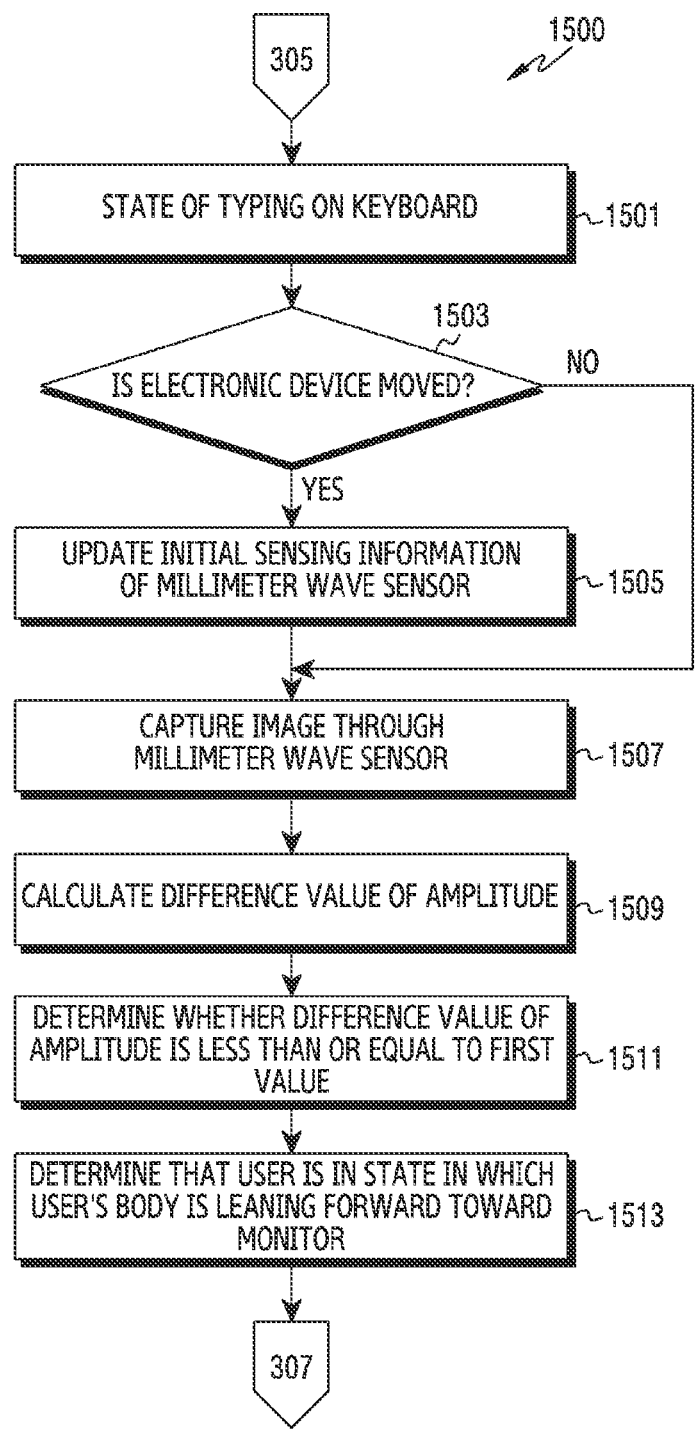
FIG. 15 is a flowchart illustrating an operation in which an electronic device obtains second user activity information according to an example embodiment.

FIG. 15 is a flowchart 1500 illustrating an operation in which an electronic device 100 obtains second user activity information according to an embodiment.

A series of operations described below may be performed simultaneously or in a different order by the electronic device 100, and some operations may be omitted or added.

Referring to FIGS. 3 and 15, in operation 305 according to an embodiment, the electronic device 100 may receive first user activity information from the wearable device 130 connected through short-range wireless communication. In operation 1501 according to an embodiment, the electronic device 100 may determine a user state, based on the first user activity information received from the wearable device 130. For example, based on the first user activity information (e.g., the data shown in graphs (a) to (c) of FIG. 8) received from the wearable device 130, the electronic device 100 may determine that the user is in the state of typing on a keyboard.

In operation 1503 according to an embodiment, the electronic device 100 may sense movement of the electronic device 100 through at least one sensor (e.g., an acceleration sensor and/or an inertial sensor). The at least one sensor is not limited to the above-described examples.

According to an embodiment, if the electronic device 100 senses the movement of the electronic device 100, the electronic device 100 may perform operation 1505, and if the electronic device 100 does not sense the movement of the electronic device 100, the electronic device 100 may perform operation 1507.

In operation 1505 according to an embodiment, the electronic device 100, in response to the electronic device 100 sensing the movement of the electronic device 100, may update initial sensing information of the millimeter wave sensor. The initial sensing information may refer to initial data (e.g., initial radar image) obtained using the millimeter wave sensor. If the electronic device 100 senses the movement of the electronic device 100, the electronic device 100 may update the initial sensing information to prevent or reduce inaccurate data produced by a change in the initial sensing information. For example, after sensing the movement of the electronic device 100, the electronic device 100 may update the initial sensing information with data (e.g., a radar image) obtained using the millimeter wave sensor.

In operation 1507 according to an embodiment, the electronic device 100 may capture a radar image through the millimeter wave sensor. According to an embodiment, the electronic device 100 may transmit a radio wave (e.g., a millimeter wave) toward an object (e.g., the user) through the millimeter wave sensor and receive a radio wave reflected from the object. The electronic device 100 may produce a radar image using the received radio wave. For example, a radar image including pixel values of a 16×16 array may be produced for a millimeter wave sensor signal having a 16×16 array.

In operation 1509 according to an embodiment, the electronic device 100 may calculate a difference value between an initial magnitude of an amplitude of the signal obtained through the millimeter wave sensor and a current magnitude thereof.

According to an embodiment, the electronic device 100 may obtain depth (or distance) information corresponding to each pixel value included in the produced radar image. The depth (or distance) information corresponding to each pixel value included in the radar image may correspond to the magnitude of an amplitude of the signal received through the millimeter wave sensor.

According to an embodiment, the electronic device 100 may determine the posture of the user through comparison between the radar images obtained through the millimeter wave sensor. For example, the electronic device 100 may calculate a difference value between depth (or distance) information (e.g., the initial magnitude of an amplitude) of each pixel included in the initial radar image updated after the movement of the electronic device 100 is detected and depth (or distance) information (e.g., the magnitude of a current amplitude) of each pixel included in the radar image captured through the millimeter wave sensor.

According to an embodiment, although the electronic device 100 may calculate a difference value according to comparison between radar images, the disclosure may not be limited thereto. For example, in the case where the electronic device 100 obtains radar images having a higher resolution than the resolution of the radar image of 16×16 array, the electronic device 100 may calculate a difference value for the amount of change (or variance) of each pixel value between the radar images having high resolution.

In operation 1511 according to an embodiment, the electronic device 100 may determine whether the calculated difference value of the amplitude is less than or equal to a first value.

In operation 1513 according to an embodiment, in response to the electronic device 100 determining that the calculated difference value of the amplitude is less than or equal to the first value, the electronic device 100 may obtain second user activity information. For example, in response to the electronic device 100 determining that the calculated difference value of the amplitude is less than or equal to the first value, the electronic device 100 may determine that the user is in the state in which user's body is leaning forward toward a monitor. In operation 307, the electronic device 100 may obtain second user activity information corresponding to the user state in which the user's body is leaning forward toward a monitor, based on the determination.

Figure 16:
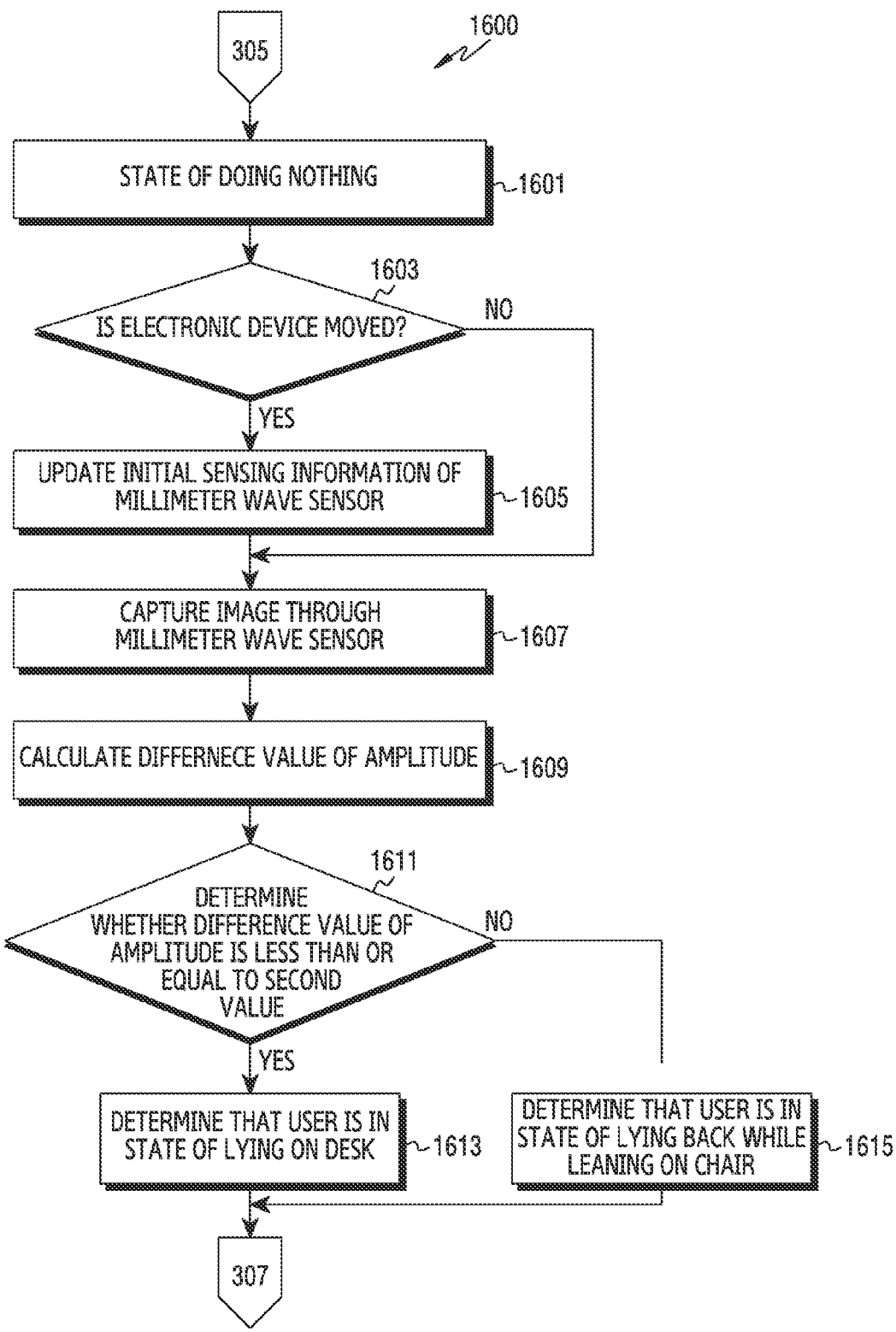
FIG. 16 is a flowchart illustrating an operation in which an electronic device obtains second user activity information according to an example embodiment.

FIG. 16 is a flowchart 1600 illustrating an operation in which an electronic device 100 obtains second user activity information according to an embodiment.

A series of operations described below may be performed simultaneously or in a different order by the electronic device 100, and some operations may be omitted or added.

Referring to FIGS. 3 and 16, in operation 305 according to an embodiment, the electronic device 100 may receive first user activity information from the wearable device 130 connected through short-range wireless communication. In operation 1601 according to an embodiment, the electronic device 100 may determine a user state, based on the first user activity information received from the wearable device 130. For example, based on the first user activity information (e.g., the data shown in graphs (a) to (c) of FIG. 6) received from the wearable device 130, the electronic device 100 may determine that the user is in the state of doing nothing.

In operation 1603 according to an embodiment, the electronic device 100 may sense movement of the electronic device 100 through at least one sensor (e.g., an acceleration sensor and/or an inertial sensor). The at least one sensor is not limited to the above-described examples.

According to an embodiment, if the electronic device 100 senses the movement of the electronic device 100, the electronic device 100 may perform operation 1605, and if the electronic device 100 does not sense the movement of the electronic device 100, the electronic device 100 may perform operation 1607.

In operation 1605 according to an embodiment, the electronic device 100, in response to the electronic device 100 sensing the movement of the electronic device 100, may update initial sensing information of the millimeter wave sensor. The initial sensing information may refer to initial data (e.g., initial radar images) obtained using the millimeter wave sensor. If the electronic device 100 senses the movement of the electronic device 100, the electronic device 100 may update the initial sensing information to prevent or reduce inaccurate data produced by a change in the initial sensing information. For example, after sensing the movement of the electronic device 100, the electronic device 100 may update the initial sensing information with data (e.g., a radar image) obtained using the millimeter wave sensor.

In operation 1607 according to an embodiment, the electronic device 100 may capture a radar image through the millimeter wave sensor. For example, the electronic device 100 may transmit a radio wave (e.g., a millimeter wave) toward an object (e.g., a user) through the millimeter wave sensor and receive a radio wave reflected from the object. The electronic device 100 may produce a radar image using the received radio wave.

In operation 1609 according to an embodiment, the electronic device 100 may calculate a difference value between an initial value of an amplitude of the radio wave obtained through the millimeter wave sensor and a current value thereof. According to an embodiment, the electronic device 100 may calculate a difference value between an initial value of an amplitude corresponding to a radio wave reflected from the object (e.g., a user) and a current value thereof. For example, the electronic device 100 may calculate a difference value between an initial value of an amplitude corresponding to pixels corresponding to the radio wave reflected from the object, among the pixels included in the radar image obtained through the millimeter wave sensor, and a current value thereof. For example, if the pixels included in the radar image are 16×16, the pixels corresponding to the radio waves reflected by the object may be 64 or more. According to an embodiment, if the amount of change in the difference value is equal to or greater than a threshold value and if the difference value is positive, it may indicate the state in which the user is leaning back. In addition, if the amount of change in the difference value is greater than or equal to a threshold value and if the difference value is negative, it may indicate the state in which the user is lying face down. In operation 1611 according to an embodiment, the electronic device 100 may determine whether the calculated difference value of the amplitude is less than or equal to a second value.

In operation 1613 according to an embodiment, if the electronic device 100 determines that the calculated difference value of the amplitude is less than or equal to the second value, the electronic device 100 may perform operation 1613, and if the electronic device 100 determines that the calculated difference value of the amplitude is equal to or greater than the second value, the electronic device 100 may perform operation 1615.

In operation 1613 according to an embodiment, in response to the electronic device 100 determining that the calculated difference value of the amplitude is less than or equal to the second value, the electronic device 100 may obtain second user activity information. For example, in response to the electronic device 100 determining that the calculated difference value of the amplitude is less than or equal to the second value, the electronic device 100 may determine that the user is in the state of lying on a desk. In operation 307, the electronic device 100 may obtain second user activity information corresponding to the state in which the user is lying on a desk, based on the determination.

In operation 1615 according to an embodiment, in response to the electronic device 100 determining that the calculated difference value of the amplitude is equal to or greater than the second value, the electronic device 100 may determine that the user is in the state of lying back while leaning on a chair. In operation 307, the electronic device 100 may obtain second user activity information corresponding to the state in which the user is lying back while leaning on a chair, based on the determination.

Figure 17:
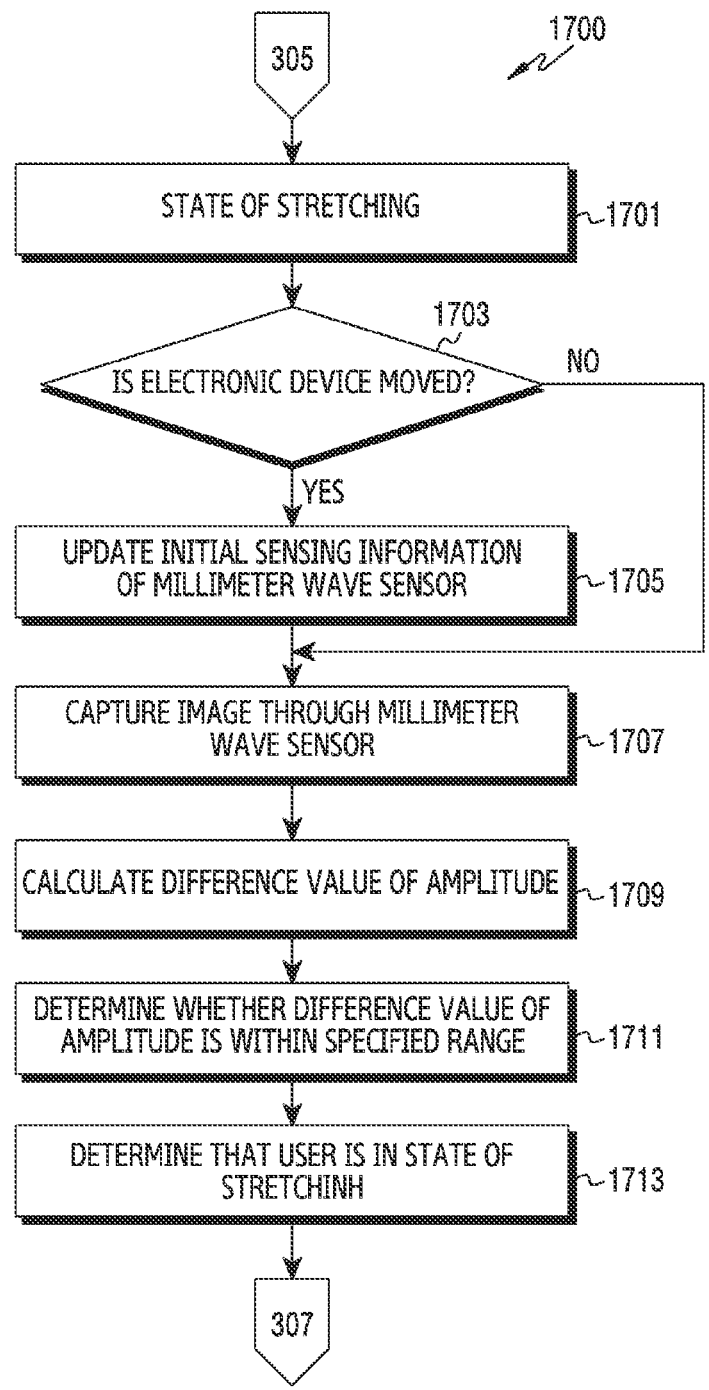
FIG. 17 is a flowchart illustrating an operation in which an electronic device obtains second user activity information according to an example embodiment.

FIG. 17 is a flowchart 1700 illustrating an operation in which an electronic device 100 obtains second user activity information according to an embodiment.

A series of operations described below may be performed simultaneously or in a different order by the electronic device 100, and some operations may be omitted or added.

Referring to FIGS. 3 and 17, in operation 305 according to an embodiment, the electronic device 100 may receive first user activity information from the wearable device 130 connected through short-range wireless communication. In operation 1701 according to an embodiment, the electronic device 100 may determine a user state, based on the first user activity information received from the wearable device 130. For example, based on the first user activity information (e.g., the data shown in graphs (a) to (c) of FIG. 7) received from the wearable device 130, the electronic device 100 may determine that the user is in the state of stretching.

In operation 1703 according to an embodiment, the electronic device 100 may sense the movement of the electronic device 100 through at least one sensor (e.g., an acceleration sensor and/or an inertial sensor). The at least one sensor is not limited to the above-described examples.

According to an embodiment, if the electronic device 100 senses the movement of the electronic device 100, the electronic device 100 may perform operation 1705, and if the electronic device 100 does not sense the movement of the electronic device 100, the electronic device 100 may perform operation 1707.

In operation 1705 according to an embodiment, in response to the electronic device 100 sensing the movement of the electronic device 100, the electronic device 100 may update initial sensing information of the millimeter wave sensor. The initial sensing information may refer to initial data obtained using the millimeter wave sensor. If the electronic device 100 senses the movement of the electronic device 100, the electronic device 100 may update the initial sensing information to prevent or reduce inaccurate data produced by a change in the initial sensing information. For example, after sensing the movement of the electronic device 100, the electronic device 100 may update the initial sensing information with data (e.g., a radar image) obtained using the millimeter wave sensor.

In operation 1707 according to an embodiment, the electronic device 100 may capture a radar image through the millimeter wave sensor. For example, the electronic device 100 may transmit a radio wave (e.g., a millimeter wave) toward an object (e.g., the user) through the millimeter wave sensor and receive a radio wave reflected from the object. The electronic device 100 may produce a radar image using the received radio wave.

In operation 1709 according to an embodiment, the electronic device 100 may calculate a difference value between an initial value of an amplitude of the radio wave obtained through the millimeter wave sensor and a current value thereof. According to an embodiment, the electronic device 100 may calculate a difference value between an initial value of an amplitude corresponding to a radio wave reflected from the object (e.g., the user) and a current value thereof. For example, the electronic device 100 may calculate a difference value between an initial value of an amplitude corresponding to pixels corresponding to the radio wave reflected from the object, among the pixels included in the radar image obtained through the millimeter wave sensor, and a current value thereof. The electronic device 100 may determine that the user is in the state of stretching, based on the calculated difference value. According to an embodiment, the electronic device 100 may determine the user state, based on a variance value of the calculated difference value. For example, if the variance value of the calculated difference value meets a predetermined criterion, the electronic device 100 may determine that the user is in the state of stretching. The predetermined criterion may indicate the case in which the calculated difference value is substantially the same but the variance value of the difference value is changed to an arbitrary value. In operation 1711 according to an embodiment, the electronic device 100 may determine whether the calculated difference value of the amplitude is within a specified range. For example, the electronic device 100 may determine whether the calculated difference value of the amplitude is greater than or equal to a third value and less than or equal to a fourth value.

In operation 1713 according to an embodiment, in response to the electronic device 100 determining that the calculated difference value of the amplitude is within the specified range (e.g., greater than or equal to the third value and less than or equal to the fourth value), the electronic device 100 may obtain second user activity information. For example, in response to the electronic device 100 determining that the calculated difference value of the amplitude is within the specified range, the electronic device 100 may determine that the user is in the state of stretching. In operation 307, the electronic device 100 may obtain second user activity information corresponding to the state in which the user is stretching, based on the determination.

TABLE 1

| Situations | Descriptions |
| --- | --- |
| Work time | Measure work time from time of typing on keyboard |
| Break time | Notify user of break time after predetermined work time |
| Working posture | Combine and provide first user activity information obtained by wearable device and second user activity information obtained by electronic device |
| Work concentration | Determine work concentration according to result of determining working posture of user |
| Wrist fatigue | Predict wrist fatigue level according to time recognized as typing on keyboard by wearable device |

Referring to Table 1, the electronic device 100 may combine the first user activity information and the second user activity information to determine user context information related to the user's work (e.g., the descriptions in Table 1) and provide content (e.g., the situations in Table 1) corresponding to the determined user context information. For example, the wearable device 130 may obtain first user activity information indicating the state in which the user is typing on a keyboard, among the user activity information recognizable through at least one sensor. The wearable device 130 may transmit the obtained first user activity information to the electronic device 100. In response to the first user activity information, received from the wearable device 130, satisfying a designated condition, the electronic device 100 may obtain second user activity information indicating the state in which the user is leaning forward toward a monitor through at least one sensor 203 (e.g., a millimeter wave sensor and/or a proximity sensor). The electronic device 100 may determine user context information indicating the state in which the user continues to work by combining the first user activity information and the second user activity information. The electronic device 100 may measure the duration of the state in which the user continues to work and determine the user's work time, based on the measured time. The electronic device 100 may provide content related to the determined work time of the user through the display module 207 (comprising at least one display). The electronic device 100 may determine a time recognized as the state of typing on a keyboard, based on the first user activity information obtained from the wearable device 130. The electronic device 100 may predict a wrist fatigue level according to the time recognized as the state of typing on a keyboard. The electronic device 100 may provide content related to the predicted wrist fatigue through the display module 207. According to an embodiment, the electronic device 100 may provide a variety of user context information, not limited to the items described in Table 1.

Figure 18A:
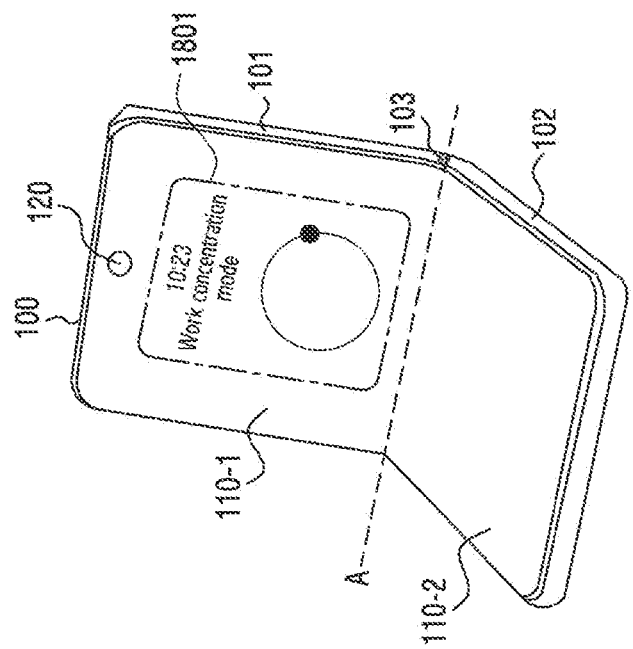
FIGS. 18(a)-(b) are diagrams illustrating the state in which an electronic device provides content corresponding to user context information through an AOD according to an example embodiment.
Figure 18B:
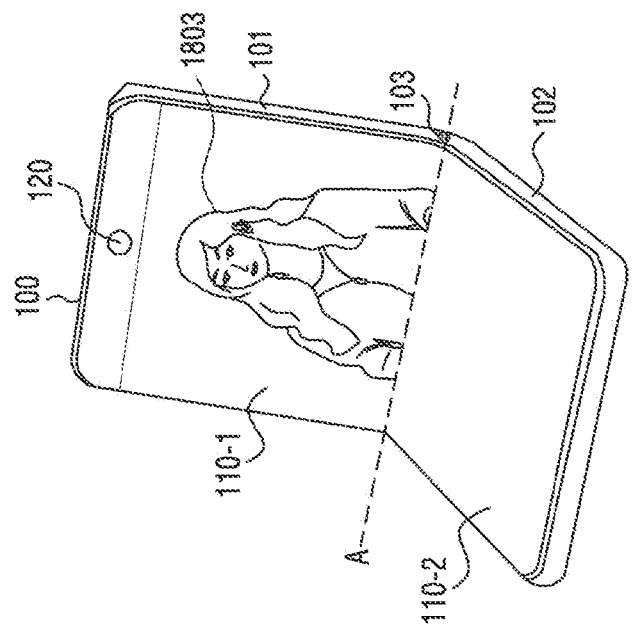

FIG. 18 illustrates the state in which an electronic device 100 provides content corresponding to user context information through an AOD according to an embodiment.

Referring to FIG. 18, the electronic device 100 may provide content corresponding to user context information. In the state in which the electronic device 100 has switched to a flex mode, the electronic device 100 may provide content corresponding to user context information through the display 110 (e.g., the display module 207 in FIG. 2). For example, the electronic device 100 may determine user context information, based on first user activity information received from the wearable device 130 and second user activity information obtained through at least one sensor included in the electronic device 100. The electronic device 100 may provide content corresponding to the determined user context information through the display 207.

Referring to (a) of FIG. 18, the wearable device 130 may obtain first user activity information indicating the state in which the user is typing on a keyboard through at least one sensor, and the wearable device 130 may transmit the obtained first user activity information to the electronic device 100 connected through short-range wireless communication (e.g., Bluetooth). In response to the first user activity information, received from the wearable device 130, satisfying a designated condition, the electronic device 100 may monitor a user state through at least one sensor 203. For example, the electronic device 100 may monitor the state in which the user is leaning toward a monitor through at least one sensor 203. The electronic device 100 may obtain second user activity information, based on the monitored state. For example, the electronic device 100 may obtain second user activity information indicating the state in which the user is leaning toward a monitor. The electronic device 100 may combine the first user activity information and the second user activity information to obtain user context information indicating the state in which the user continues to work. The electronic device 100 may provide content corresponding to the obtained user context information. For example, referring to (a) of FIG. 18, the electronic device 100 may provide a UI 1801 related to a work concentration mode corresponding to the obtained user context information through the display 207. The electronic device 100 may determine user context information through user's location information (e.g., company) and time (e.g., day of the week and time zone), as well as the first user activity information (or the first user context information) and the second user activity information (or the second user context information). The work concentration mode may indicate a mode configured such that notifications, except for an app (e.g., a phone call or a message) specified by the user, are blocked.

Referring to (b) of FIG. 18, in the state in which the electronic device 100 has switched to the flex mode, the electronic device 100 may sense that the user exists in front of the electronic device 100 through at least one sensor (e.g., a millimeter wave sensor and/or a proximity sensor). In response to the electronic device 100 determining that the user exists in front of the electronic device 100, the electronic device 100 may perform user authentication using the wearable device 130 connected through short-range wireless communication (e.g., Bluetooth). According to an embodiment, the electronic device 100 may authenticate the user using the camera 120. For example, the electronic device 100 may obtain a user image 1803 through the camera 120 and compare pre-stored user image data with the user image obtained through the camera 120 to authenticate the user.

According to an embodiment, the electronic device 100 may perform recording through the camera 120. The electronic device 100 may sense a change in the user state or a user's motion through at least one of a location sensor and a proximity sensor. The electronic device 100 may take a snapshot or a shot clip through the camera 120, based on the sensed change in the user state or user's motion. The user's motion may include a user's voice command, recognition of a gesture through the wearable device 100 (e.g., a smartwatch or earbud) worn by the user, a user approaching the electronic device 100, or a user stretching.

According to an embodiment, an electronic device 100 may include a first housing 101, a second housing 102 coupled, directly or indirectly, to the first housing 101 through at least a connection member, at least one sensor, a communication circuit 205, a flexible display 110 disposed over one surface of the first housing 101 and one surface of the second housing 102, a memory 209, and a processor 201 (comprising processing circuitry) operatively connected, directly or indirectly, to the at least one sensor, the communication circuit 205, the flexible display 110, and the memory 209, wherein the processor 201 may be configured to establish short-range wireless communication connection with a wearable device through the communication circuit 205, enter a flex mode, based on an angle between the first housing 101 and the second housing 102, receive, from the wearable device, first user activity information obtained by the wearable device using the short-range wireless communication connection, in response to the received first user activity information satisfying a designated condition, obtain second user activity information through the at least one sensor, obtain user context information, based on the first user activity information and the second user activity information, and provide content corresponding to the obtained user context information through the flexible display 110.

According to an embodiment, the at least one sensor may include at least one of an inertial sensor, a proximity sensor, or a millimeter wave (mmWave) sensor.

According to an embodiment, the processor 201 may obtain the second user activity information through at least one of the millimeter wave sensor and the proximity sensor.

According to an embodiment, the millimeter wave sensor may include a first antenna module configured to transmit a signal and a second antenna module configured to receive the signal, and the first antenna module and the second antenna module may be disposed in bezel of at least of the first housing 101 or the second housing 102 or one inner surface thereof.

According to an embodiment, the electronic device 100 may further include a camera 120, and the processor 201 may obtain an image of a user through the camera 120 and obtain the second user activity information, based on the obtained image.

According to an embodiment, the electronic device 100 may further include a first inertial sensor disposed inside the first housing 101 and a second inertial sensor disposed inside the second housing 102.

According to an embodiment, the processor 201 may determine the angle between the first housing 101 and the second housing 102, based on information obtained through the first inertial sensor and the second inertial sensor, determine whether or not the determined angle is included in a specified range, and in response to the determined angle being included in the specified range, enter the flex mode.

According to an embodiment, the processor 201 may determine whether or not the received first user activity information satisfies the designated condition and, in response to the received first user activity information satisfying the designated condition, drive the at least one sensor.

According to an embodiment, the processor 201 may provide content corresponding to the obtained user context information as an always-on-display (AOD) through the flexible display 110 in the state of having entered the flex mode.

According to an embodiment, the processor 201 may sense whether or not the position of the electronic device 100 is moved through the at least one sensor and, in response to moving of the position of the electronic device 100, update an initial value for determining the second user activity information.

According to an embodiment, a method of operating an electronic device 100 may include establishing short-range wireless communication connection with a wearable device through a communication circuit 205, entering a flex mode, based on an angle between a first housing 101 and a second housing 102, receiving, from the wearable device, first user activity information obtained by the wearable device using the short-range wireless communication connection, obtaining second user activity information through the at least one sensor in response to the received first user activity information satisfying a designated condition, obtaining user context information, based on the first activity information and the second activity information, and providing content corresponding to the obtained user context information through the flexible display 110.

According to an embodiment, the method of operating an electronic device 100 may include obtaining the second user activity information through at least one of a millimeter wave (mmWave) sensor or a proximity sensor.

According to an embodiment, the method of operating an electronic device 100 may include obtaining an image of a user through a camera 120 and obtaining the second user activity information, based on the obtained image.

According to an embodiment, the method of operating an electronic device 100 may include determining the angle between the first housing 101 and the second housing 102, based on information obtained through a first inertial sensor and a second inertial sensor, determining whether or not the determined angle is included in a specified range, and in response to the determined angle being included in the specified range, entering the flex mode.

According to an embodiment, the method of operating an electronic device 100 may include determining whether or not the received first user activity information satisfies the designated condition and, in response to the received first user activity information satisfying the designated condition, driving the at least one sensor.

According to an embodiment, the method of operating an electronic device 100 may include providing content corresponding to the obtained user context information as an always-on-display (AOD) through the flexible display 110 in the state of having entered the flex mode.

According to an embodiment, the method of operating an electronic device 100 may include sensing whether or not the position of the electronic device 100 is moved through the at least one sensor and, in response to moving of the position of the electronic device 100, updating an initial value for determining the second user activity information.

According to an embodiment, a system may include an electronic device 100 and a wearable device connected to the electronic device through short-range wireless communication connection. The electronic device 100 may enter a flex mode, based on an angle between a first housing 101 and a second housing 102, and the wearable device may obtain first user activity information through at least one sensor, transmit the obtained first user activity information to the electronic device using the short-range wireless communication, and the electronic device 100 may receive, from the wearable device, the first user activity information using the short-range wireless communication, obtain second user activity information through at least one sensor in response to the received first user activity information satisfying a designated condition, obtain user context information, based on the first user activity information and the second user activity information, and provide content corresponding to the obtained user context information through a flexible display 110. "Based on" as used herein covers based at least on.

According to an embodiment, the wearable device may obtain the first user activity information through an acceleration sensor and an atmospheric pressure sensor, and the electronic device 100 may determine whether or not the received first user activity information satisfies the designated condition and, in response to the received first user activity information satisfying the designated condition, drive the at least one sensor.

According to an embodiment, the wearable device may determine whether or not sensor information sensed through the acceleration sensor and the atmospheric pressure sensor satisfies a designated condition and, in response to the sensor information satisfying the designated condition, determine the first user information.

Figure 19A:
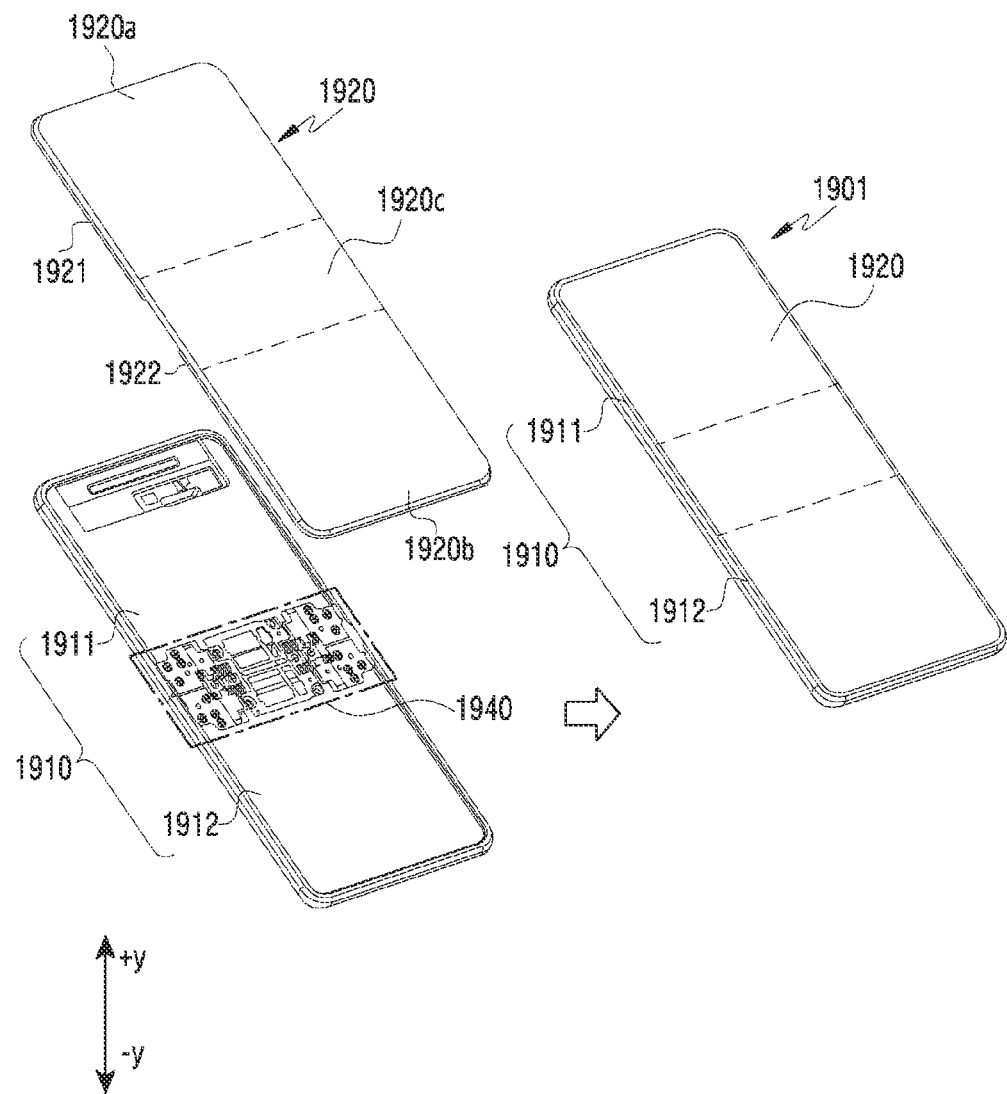
FIG. 19A illustrates an exploded view and an unfolded state of an electronic device according to an example embodiment.
Figure 19B:
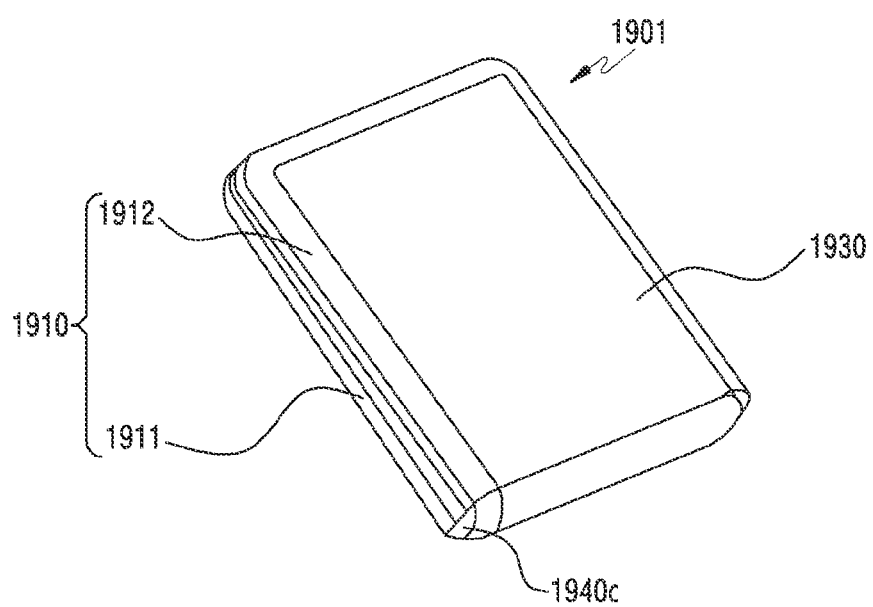
FIG. 19B illustrates a folded state of an electronic device according to an example embodiment.

FIG. 19A illustrates an exploded view and an unfolded state of an electronic device 1901 according to an embodiment, and FIG. 19B illustrates a folded state of an electronic device 1901 according to an embodiment.

Referring to FIGS. 19A and 19B, an electronic device 1901 (e.g., the electronic device 100 in FIG. 1) according to an embodiment may include a foldable housing 1910 (or "housing") including a first housing 1911 and a second housing 1912, a flexible display 1920, a hinge assembly 1940, or a cover (or "rear cover") (e.g., a first cover (not shown) and a second cover 1930).

According to an embodiment, the first housing 1911 and the second housing 1912 may produce a space in which electronic components (e.g., a printed circuit board, a battery, or a processor) of the electronic device 1901 may be disposed and form a side surface of the electronic device 1901. For example, various types of components for performing various functions of the electronic device 1901 may be disposed inside the first housing 1911 and the second housing 1912. For example, electronic components such as a front camera, a receiver, or a sensor (e.g., a proximity sensor) may be disposed inside the first housing 1911 and the second housing 1912. Although not shown in the drawings, the above-described electronic components may be exposed on the front surface of the electronic device 1901 through at least one opening or recess provided in the flexible display 1920.

According to an embodiment, the first housing 1911 and the second housing 1912 may be arranged side by side when the electronic device 1901 is in an unfolded state. According to another embodiment, when the electronic device 1901 is in a folded state, the first housing 1911 may pivot (or rotate) relative to the second housing 1912 in a predetermined range to be disposed such that one surface of the first housing 1911 substantially faces one surface of the second housing 1912.

According to an embodiment, the first housing 1911 and the second housing 1912 may form a recess for accommodating the flexible display 1920, and the flexible display 1920 may be seated in the recess to be supported by the first housing 1911 and the second housing 1912. According to another embodiment, the flexible display 1920 may be supported by a first support plate 1921 and/or a second support plate 1922 positioned between the flexible display 1920 and the first housing 1911, and/or the second housing 1912, which will be described in more detail later. The first housing 1911 and the second housing 1912 may be formed of a metal material and/or a non-metal material having a specified rigidity to support the flexible display 1920.

According to an embodiment, the flexible display 1920 may be disposed on, directly or indirectly, the first housing 1911 and the second housing 1912 to form a front surface of the electronic device 1901 (e.g., the surface in the +y direction in FIG. 19A) when the electronic device 1901 is in the unfolded state. That is, the flexible display 1920 may be disposed to extend from one area of the first housing 1911 to at least one area of the second housing 1912 across the hinge assembly 1940. According to an embodiment, the flexible display 1920 may be seated in a recess formed by the first housing 1911 and the second housing 1912 to be disposed on the first housing 1911 and the second housing 1912.

In an example, the flexible display 1920 may include a first area 1920a corresponding to at least one area of the first housing 1911, a second area 1920b corresponding to at least one area of the second housing 1912, and a folding area 1920c positioned between the first area 1920a and the second area 1920b and having flexible characteristics. However, the disclosure is not limited to the above embodiment, and all of the first area 1920a, the second area 1920b, or the folding area 1920c of the flexible display 1920 may be formed to have flexible characteristics depending on the embodiment. For example, when the electronic device 1901 is in the unfolded state, the first area 1920a, the folding area 1920c, and the second area 1920b may be disposed side by side to face in the same direction (e.g., the +y direction in FIG. 19A). In an example, when the electronic device 1901 is in the folded state, the folding area 1920c may be bent so that the first area 1920a and the second area 1920b may be disposed to face each other.

According to an embodiment, at least one area (e.g., the first area 1920a or the second area 1920b) of the flexible display 1920 may be attached to one surface of the first housing 1911 and one surface of the second housing 1912. According to another embodiment, the flexible display 1920 may also be attached to one surface of the first housing 1911 and one surface of the second housing 1912 through the support plate 1921 or 1922 positioned between the flexible display 1920 and the first housing 1911 or the second housing 1912.

For example, the support plates 1921 and 1922 may include a first support plate 1921 attached to at least one area of the first housing 1911 to support the first area 1920a of the flexible display 1920 and a second support plate 1922 attached to at least one area of the second housing 1912 to support the second area 1920b of the flexible display 1920. The first support plate 1921 may be attached to at least a portion of the first area 1920a of the flexible display 1920 to support the flexible display 1920. Similarly, the second support plate 1922 may be attached to at least a portion of the second area 1920b of the flexible display 1920 to support the flexible display 1920. The first support plate 1921 and the second support plate 1922 may be formed of a material having rigidity to support the flexible display 1920.

According to an embodiment, the hinge assembly 1940 may couple the first housing 1911 and the second housing 1912, and enable the second housing 1912 to rotate relative to the first housing 1911 within a specified rotation range or enable the first housing 1911 to rotate relative to the second housing 1912 within a specified rotation range.

For example, a recess may be formed in the area where the first housing 1911 and the second housing 1912 are coupled, directly or indirectly, so that the hinge assembly 1940 may be disposed between the first housing 1911 and the second housing 1912. The above-described recess may be formed in a groove shape having a constant curvature as an example, but is not limited thereto.

The hinge assembly 1940 may include a hinge housing 1940c, and the hinge housing 1940c may be visually viewed from the outside of the electronic device 1901 or may be covered by the foldable housing 1910 depending on the state of the electronic device 1901. For example (e.g., referring to FIG. 19A), when the electronic device 1901 is in the unfolded state, the hinge housing 1940c may be covered by the foldable housing 1910 so as not to be viewed from the outside of the electronic device 1901. As another example (e.g., referring to FIG. 19B), when the electronic device 1901 is in the folded state, the hinge housing 1940c may be viewed from the outside of the electronic device 1901 by rotation of the first housing 1911 and the second housing 1912.

For example, the cover may be positioned at lower ends (e.g., in the −y direction in FIG. 19A) of the first housing 1911 and the second housing 1912 to form a rear surface of the electronic device 1901. For example, the cover may include a first cover (not shown) coupled, directly or indirectly, to the first housing 1911 and a second cover 1930 coupled, directly or indirectly, to the second housing 1912. As another example, the first cover and the first housing 1911 may be integrally formed, and the second cover and the second housing 1912 may also be integrally formed.

Figure 20:
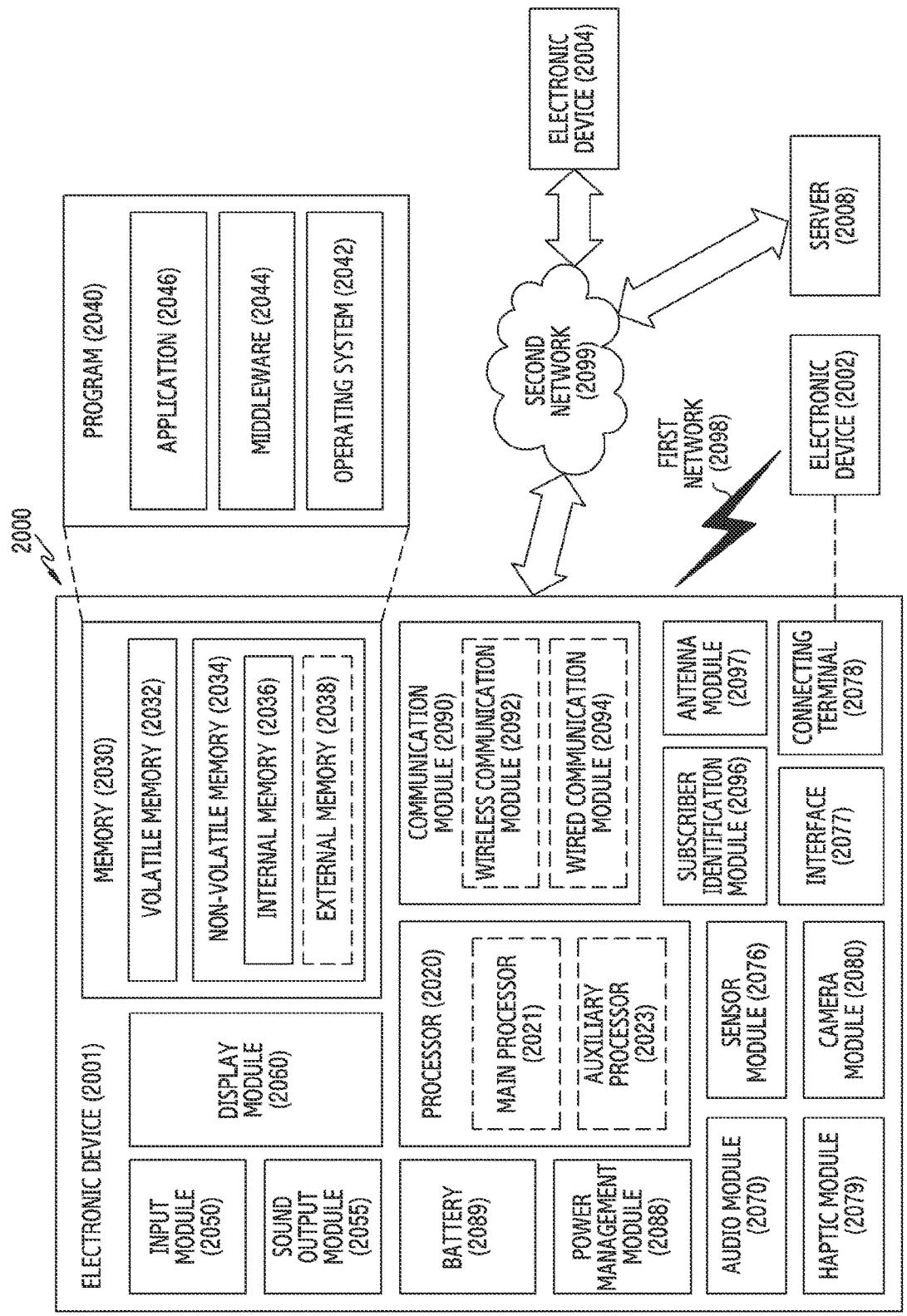
FIG. 20 is a block diagram illustrating an electronic device in a network environment according to an example embodiment.

FIG. 20 is a block diagram illustrating an electronic device 2001 in a network environment 2000 according to various embodiments.

Referring to FIG. 20, the electronic device 2001 in the network environment 2000 may communicate with an electronic device 2002 via a first network 2098 (e.g., a short-range wireless communication network), or at least one of an electronic device 2004 or a server 2008 via a second network 2099 (e.g., a long-range wireless communication network). According to an embodiment, the electronic device 2001 may communicate with the electronic device 2004 via the server 2008. According to an embodiment, the electronic device 2001 may include a processor 2020, memory 2030, an input module 2050, a sound output module 2055, a display module 2060, an audio module 2070, a sensor module 2076, an interface 2077, a connecting terminal 2078, a haptic module 2079, a camera module 2080, a power management module 2088, a battery 2089, a communication module 2090, a subscriber identification module (SIM) 2096, or an antenna module 2097. In some embodiments, at least one of the components (e.g., the connecting terminal 2078) may be omitted from the electronic device 2001, or one or more other components may be added in the electronic device 2001. In some embodiments, some of the components (e.g., the sensor module 2076, the camera module 2080, or the antenna module 2097) may be implemented as a single component (e.g., the display module 2060).

The processor 2020 may execute, for example, software (e.g., a program 2040) to control at least one other component (e.g., a hardware or software component) of the electronic device 2001 coupled with the processor 2020, and may perform various data processing or computation. According to an embodiment, as at least part of the data processing or computation, the processor 2020 may store a command or data received from another component (e.g., the sensor module 2076 or the communication module 2090) in volatile memory 2032, process the command or the data stored in the volatile memory 2032, and store resulting data in non-volatile memory 2034. According to an embodiment, the processor 2020 may include a main processor 2021 (e.g., a central processing unit (CPU) or an application processor (AP)), or an auxiliary processor 2023 (e.g., a graphics processing unit (GPU), a neural processing unit (NPU), an image signal processor (ISP), a sensor hub processor, or a communication processor (CP)) that is operable independently from, or in conjunction with, the main processor 2021. For example, when the electronic device 2001 includes the main processor 2021 and the auxiliary processor 2023, the auxiliary processor 2023 may be adapted to consume less power than the main processor 2021, or to be specific to a specified function. The auxiliary processor 2023 may be implemented as separate from, or as part of the main processor 2021.

The auxiliary processor 2023 may control at least some of functions or states related to at least one component (e.g., the display module 2060, the sensor module 2076, or the communication module 2090) among the components of the electronic device 2001, instead of the main processor 2021 while the main processor 2021 is in an inactive (e.g., sleep) state, or together with the main processor 2021 while the main processor 2021 is in an active state (e.g., executing an application). According to an embodiment, the auxiliary processor 2023 (e.g., an image signal processor or a communication processor) may be implemented as part of another component (e.g., the camera module 2080 or the communication module 2090) functionally related to the auxiliary processor 2023. According to an embodiment, the auxiliary processor 2023 (e.g., the neural processing unit) may include a hardware structure specified for artificial intelligence model processing. An artificial intelligence model may be generated by machine learning. Such learning may be performed, e.g., by the electronic device 2001 where the artificial intelligence is performed or via a separate server (e.g., the server 2008). Learning algorithms may include, but are not limited to, e.g., supervised learning, unsupervised learning, semi-supervised learning, or reinforcement learning. The artificial intelligence model may include a plurality of artificial neural network layers. The trained artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2030 may store various data used by at least one component (e.g., the processor 2020 or the sensor module 2076) of the electronic device 2001. The various data may include, for example, software (e.g., the program 2040) and input data or output data for a command related thereto. The memory 2030 may include the volatile memory 2032 or the non-volatile memory 2034.

The program 2040 may be stored in the memory 2030 as software, and may include, for example, an operating system (OS) 2042, middleware 2044, or an application 2046.

The input module 2050 may receive a command or data to be used by another component (e.g., the processor 2020) of the electronic device 2001, from the outside (e.g., a user) of the electronic device 2001. The input module 2050 may include, for example, a microphone, a mouse, a keyboard, a key (e.g., a button), or a digital pen (e.g., a stylus pen).

The sound output module 2055 may output sound signals to the outside of the electronic device 2001. The sound output module 2055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 2060 may visually provide information to the outside (e.g., a user) of the electronic device 2001. The display module 2060 may include, for example, a display, a hologram device, or a projector and control circuitry to control a corresponding one of the display, hologram device, and projector. According to an embodiment, the display module 2060 may include a touch sensor adapted to detect a touch, or a pressure sensor adapted to measure the intensity of force incurred by the touch.

The audio module 2070 may convert a sound into an electrical signal and vice versa. According to an embodiment, the audio module 2070 may obtain the sound via the input module 2050, or output the sound via the sound output module 2055 or a headphone of an external electronic device (e.g., an electronic device 2002) directly (e.g., wiredly) or wirelessly coupled with the electronic device 2001.

The sensor module 2076 may detect an operational state (e.g., power or temperature) of the electronic device 2001 or an environmental state (e.g., a state of a user) external to the electronic device 2001, and then generate an electrical signal or data value corresponding to the detected state. According to an embodiment, the sensor module 2076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2077 may support one or more specified protocols to be used for the electronic device 2001 to be coupled with the external electronic device (e.g., the electronic device 2002) directly (e.g., wiredly) or wirelessly. According to an embodiment, the interface 2077 may include, for example, a high definition multimedia interface (HDMI), a universal serial bus (USB) interface, a secure digital (SD) card interface, or an audio interface.

A connecting terminal 2078 may include a connector via which the electronic device 2001 may be physically connected, directly or indirectly, with the external electronic device (e.g., the electronic device 2002). According to an embodiment, the connecting terminal 2078 may include, for example, a HDMI connector, a USB connector, a SD card connector, or an audio connector (e.g., a headphone connector).

The haptic module 2079 may convert an electrical signal into a mechanical stimulus (e.g., a vibration or a movement) or electrical stimulus which may be recognized by a user via his tactile sensation or kinesthetic sensation. According to an embodiment, the haptic module 2079 may include, for example, a motor, a piezoelectric element, or an electric stimulator.

The camera module 2080 may capture a still image or moving images. According to an embodiment, the camera module 2080 may include one or more lenses, image sensors, image signal processors, or flashes.

The power management module 2088 may manage power supplied to the electronic device 2001. According to an embodiment, the power management module 2088 may be implemented as at least part of, for example, a power management integrated circuit (PMIC).

The battery 2089 may supply power to at least one component of the electronic device 2001. According to an embodiment, the battery 2089 may include, for example, a primary cell which is not rechargeable, a secondary cell which is rechargeable, or a fuel cell.

The communication module 2090 may support establishing a direct (e.g., wired) communication channel or a wireless communication channel between the electronic device 2001 and the external electronic device (e.g., the electronic device 2002, the electronic device 2004, or the server 2008) and performing communication via the established communication channel. The communication module 2090 may include one or more communication processors that are operable independently from the processor 2020 (e.g., the application processor (AP)) and supports a direct (e.g., wired) communication or a wireless communication. According to an embodiment, the communication module 2090 may include a wireless communication module 2092 (e.g., a cellular communication module, a short-range wireless communication module, or a global navigation satellite system (GNSS) communication module) or a wired communication module 2094 (e.g., a local area network (LAN) communication module or a power line communication (PLC) module). A corresponding one of these communication modules may communicate with the external electronic device via the first network 2098 (e.g., a short-range communication network, such as Bluetooth™, wireless-fidelity (Wi-Fi) direct, or infrared data association (IrDA)) or the second network 2099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2092 may identify and authenticate the electronic device 2001 in a communication network, such as the first network 2098 or the second network 2099, using subscriber information (e.g., international mobile subscriber identity (IMSI)) stored in the subscriber identification module 2096.

The wireless communication module 2092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2092 may support a high-frequency band (e.g., the mmWave band) to achieve, e.g., a high data transmission rate. The wireless communication module 2092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2092 may support various requirements specified in the electronic device 2001, an external electronic device (e.g., the electronic device 2004), or a network system (e.g., the second network 2099). According to an embodiment, the wireless communication module 2092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 2097 may transmit or receive a signal or power to or from the outside (e.g., the external electronic device) of the electronic device 2001. According to an embodiment, the antenna module 2097 may include an antenna including a radiating element composed of a conductive material or a conductive pattern formed in or on a substrate (e.g., a printed circuit board (PCB)). According to an embodiment, the antenna module 2097 may include a plurality of antennas (e.g., array antennas). In such a case, at least one antenna appropriate for a communication scheme used in the communication network, such as the first network 2098 or the second network 2099, may be selected, for example, by the communication module 2090 (e.g., the wireless communication module 2092) from the plurality of antennas. The signal or the power may then be transmitted or received between the communication module 2090 and the external electronic device via the selected at least one antenna. According to an embodiment, another component (e.g., a radio frequency integrated circuit (RFIC)) other than the radiating element may be additionally formed as part of the antenna module 2097.

According to various embodiments, the antenna module 2097 may form a mmWave antenna module. According to an embodiment, the mmWave antenna module may include a printed circuit board, a RFIC disposed on, directly or indirectly, a first surface (e.g., the bottom surface) of the printed circuit board, or adjacent to the first surface and capable of supporting a designated high-frequency band (e.g., the mmWave band), and a plurality of antennas (e.g., array antennas) disposed on, directly or indirectly, a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2001 and the external electronic device 2004 via the server 2008 coupled with the second network 2099. Each of the electronic devices 2002 or 2004 may be a device of a same type as, or a different type, from the electronic device 2001. According to an embodiment, all or some of operations to be executed at the electronic device 2001 may be executed at one or more of the external electronic devices 2002, 2004, or 2008. For example, if the electronic device 2001 should perform a function or a service automatically, or in response to a request from a user or another device, the electronic device 2001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2001. The electronic device 2001 may provide the outcome, with or without further processing of the outcome, as at least part of a reply to the request. To that end, a cloud computing, distributed computing, mobile edge computing (MEC), or client-server computing technology may be used, for example. The electronic device 2001 may provide ultra low-latency services using, e.g., distributed computing or mobile edge computing. In another embodiment, the external electronic device 2004 may include an internet-of-things (IoT) device. The server 2008 may be an intelligent server using machine learning and/or a neural network. According to an embodiment, the external electronic device 2004 or the server 2008 may be included in the second network 2099. The electronic device 2001 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 2040) including one or more instructions that are stored in a storage medium (e.g., internal memory 2036 or external memory 2038) that is readable by a machine (e.g., the electronic device 2001). For example, a processor (e.g., the processor 2020) of the machine (e.g., the electronic device 2001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
a first housing;
a second housing coupled to the first housing through at least one connector;
at least one sensor;
a communication circuit;
a flexible display disposed over a surface of the first housing and a surface of the second housing;
a memory; and
at least one processor operatively connected to the at least one sensor, the communication circuit, the flexible display, and the memory,
wherein the at least one processor is configured to:
establish short-range wireless communication connection with a wearable device via the communication circuit;
enter a flex mode, based on an angle between the first housing and the second housing;
receive, from the wearable device, first user activity information in the flex mode;
based on the received first user activity information satisfying a predetermined condition, obtain second user activity information via the at least one sensor;
obtain user context information, based on combination of the first user activity information and the second user activity information; and
provide content related to the obtained user context information via the flexible display,
wherein the first user activity information includes user status information obtained based on acceleration of a user's wrist and pressure information of the user's wrist acquired by the wearable device, and
wherein the second user activity information includes user posture acquired by the electronic device.

2. The electronic device of claim 1, wherein the predetermined condition includes whether the user is typing on a keyboard.

3. The electronic device of claim 1, wherein the at least one sensor comprises at least one of: an inertial sensor, a proximity sensor, or a millimeter wave (mmWave) sensor, and the at least one processor is configured to obtain the second user activity information through at least one of the millimeter wave sensor and the proximity sensor.

4. The electronic device of claim 3, wherein the millimeter wave sensor comprises a first antenna module configured to transmit a signal and a second antenna module configured to receive the signal, and the first antenna module and the second antenna module are disposed in bezel of at least of the first housing or the second housing or one inner surface thereof,
wherein each of the antenna modules comprises at least one antenna.

5. The electronic device of claim 1, further comprising a camera,
wherein the at least one processor is configured to:
obtain an image of a user through the camera; and
obtain the second user activity information, based on the obtained image.

6. The electronic device of claim 1, further comprising a first inertial sensor disposed inside the first housing and a second inertial sensor disposed inside the second housing.

7. The electronic device of claim 6, wherein the at least one processor is configured to:
determine the angle between the first housing and the second housing, based on information obtained through the first inertial sensor and the second inertial sensor;
determine whether the determined angle is included in a specified range; and
based on the determined angle being included in the specified range, enter the flex mode.

8. The electronic device of claim 1, wherein the at least one processor is configured to:
determine whether the received first user activity information satisfies the predetermined condition, wherein the predetermined condition includes whether the user is typing on a keyboard; and
based on the received first user activity information satisfying the predetermined condition, drive the at least one sensor to monitor a state of the user.

9. The electronic device of claim 1, wherein the at least one processor is configured to provide content corresponding to the obtained user context information as an always-on-display (AOD) through the flexible display in the state of having entered the flex mode.

10. The electronic device of claim 1, wherein the at least one processor is configured to:
sense whether the position of the electronic device is moved through the at least one sensor; and
based on moving of the position of the electronic device, update an initial value for determining the second user activity information.

11. A method of operating an electronic device, the method comprising:
establishing a short-range wireless communication connection with a wearable device through a communication circuit, entering a flex mode, based on an angle between a first housing and a second housing,
receiving, from the wearable device, first user activity information obtained by the wearable device using the short-range wireless communication connection in the flex mode,
in response to the received first user activity information satisfying a predetermined condition, obtaining second user activity information through at least one sensor,
obtaining user context information, based on combination of the first user activity information and the second user activity information, and
providing content corresponding to the obtained user context information through a flexible display,
wherein the first user activity information includes user status information obtained based on acceleration of a user's wrist and pressure information of the user's wrist acquired by the wearable device, and
wherein the second user activity information includes user posture acquired by the electronic device.

12. The method of claim 11, further comprising obtaining the second user activity information through at least one of a millimeter wave (mmWave) sensor or a proximity sensor.

13. The method of claim 11, further comprising:
obtaining an image of a user through a camera; and
obtaining the second user activity information, based on the obtained image.

14. The method of claim 11, further comprising:
determining the angle between the first housing and the second housing, based on information obtained through a first inertial sensor and a second inertial sensor;
determining whether the determined angle is included in a specified range; and in response to the determined angle being included in the specified range, entering the flex mode.

15. The method of claim 11, further comprising:
determining whether the received first user activity information satisfies the predetermined condition, wherein the predetermined condition includes whether the user is typing on a keyboard; and
in response to the received first user activity information satisfying the predetermined condition, driving the at least one sensor to monitor a state of the user.

16. The method of claim 11, wherein the predetermined condition includes whether the user is typing on a keyboard.

\* \* \* \* \*